US011368941B2

(12) United States Patent
MolavianJazi et al.

(10) Patent No.: US 11,368,941 B2
(45) Date of Patent: Jun. 21, 2022

(54) UPLINK TRANSMISSION POWER ALLOCATION

(71) Applicant: Lenovo (Singapore) PTE. LTD., New Tech Park (SG)

(72) Inventors: Ebrahim MolavianJazi, Lincolnwood, IL (US); Hyejung Jung, Northbrook, IL (US); Vijay Nangia, Woodridge, IL (US); Joachim Loehr, Wiesbaden (DE); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 108 days.

(21) Appl. No.: 16/537,340

(22) Filed: Aug. 9, 2019

(65) Prior Publication Data

US 2020/0053710 A1 Feb. 13, 2020

Related U.S. Application Data

(60) Provisional application No. 62/716,923, filed on Aug. 9, 2018.

(51) Int. Cl.
*H04L 12/50* (2006.01)
*H04W 72/04* (2009.01)
(Continued)

(52) U.S. Cl.
CPC ....... *H04W 72/0413* (2013.01); *H04L 5/0048* (2013.01); *H04W 52/146* (2013.01);
(Continued)

(58) Field of Classification Search
CPC ...................................................... H04L 12/28
(Continued)

(56) References Cited

U.S. PATENT DOCUMENTS 8,626,225 B2 1/2014 Heo et al.
8,873,497 B2 10/2014 Ahn et al.
(Continued)

OTHER PUBLICATIONS

Samsung [RAN1], "[Draft] LS on UL cross carrier beam indication", 3GPP TSG RAN WG1 Meeting #92bis R1-1805739, Apr. 16-20, 2018, p. 1.
(Continued)

*Primary Examiner* — Dang T Ton
(74) *Attorney, Agent, or Firm* — Kunzler Bean & Adamson

(57) ABSTRACT

Apparatuses, methods, and systems are disclosed for uplink transmission power allocation. One method includes receiving a configuration of two uplink carriers. The method includes determining whether a configuration parameter corresponding to at least one of a first uplink carrier and a second uplink carrier for a serving cell is configured. The method includes determining whether a total user equipment transmit power for uplink transmissions in a transmission occasion exceeds a maximum user equipment output power, wherein the uplink transmissions comprise a first uplink transmission on the first uplink carrier and a second uplink transmission. The method includes, in response to determining that the total user equipment transmit power for uplink transmissions in the transmission occasion exceeds the maximum user equipment output power, determining a first priority level for the first uplink transmission and a second priority level for the second uplink transmission.

14 Claims, 8 Drawing Sheets

(51) Int. Cl.
*H04W 52/14* (2009.01)
*H04W 52/36* (2009.01)
*H04L 5/00* (2006.01)
*H04W 52/34* (2009.01)
*H04W 72/10* (2009.01)

(52) U.S. Cl.
CPC ......... *H04W 52/34* (2013.01); *H04W 52/365* (2013.01); *H04W 52/367* (2013.01); *H04W 72/044* (2013.01); *H04W 72/0473* (2013.01); *H04W 72/10* (2013.01)

(58) Field of Classification Search
USPC .......................................................... 370/329
See application file for complete search history.

(56) References Cited

U.S. PATENT DOCUMENTS

| | | | |
|---|---|---|---|
| 9,007,997 | B2 | 4/2015 | Moon et al. |
| 10,517,045 | B2 | 12/2019 | Wang et al. |
| 2006/0045046 | A1 | 3/2006 | Kim et al. |
| 2009/0253435 | A1 | 10/2009 | Olofsson et al. |
| 2013/0230010 | A1 | 9/2013 | Kim et al. |
| 2016/0295522 | A1 | 10/2016 | Qin et al. |
| 2017/0013565 | A1 | 1/2017 | Pelletier et al. |
| 2017/0230843 | A1 | 8/2017 | Ouchi et al. |
| 2017/0265166 | A1 | 9/2017 | Hosseini et al. |
| 2018/0115447 | A1 | 4/2018 | Hasegawa et al. |
| 2018/0131587 | A1 | 5/2018 | Patil et al. |
| 2018/0184440 | A1 | 6/2018 | Lin |
| 2018/0310257 | A1 | 10/2018 | Papasakellariou |
| 2018/0359711 | A1 | 12/2018 | Akkarakaran et al. |
| 2019/0159136 | A1 | 5/2019 | MolavianJazi et al. |
| 2019/0159140 | A1 | 5/2019 | Wang et al. |
| 2019/0159143 | A1 | 5/2019 | Li et al. |
| 2019/0199571 | A1 | 6/2019 | John Wilson et al. |
| 2019/0215784 | A1 | 7/2019 | Hwang et al. |
| 2019/0246432 | A1 | 8/2019 | Hosseini et al. |
| 2019/0253976 | A1 | 8/2019 | Pelletier et al. |
| 2019/0268855 | A1 | 8/2019 | Kim et al. |
| 2019/0268929 | A1 | 8/2019 | Lee et al. |
| 2019/0313343 | A1* | 10/2019 | MolavianJazi ....... H04W 52/44 |
| 2019/0313419 | A1 | 10/2019 | Fakoorian et al. |
| 2020/0053657 | A1 | 2/2020 | MolavianJazi et al. |
| 2020/0053724 | A1 | 2/2020 | MolavianJazi et al. |
| 2020/0245257 | A1* | 7/2020 | Pelletier .............. H04W 52/365 |
| 2022/0007360 | A1 | 1/2022 | Molavian Jazi et al. |

OTHER PUBLICATIONS

RAN1, "LS on UL cross carrier beam indication", 3GPP TSG RAN WG1 Meeting #92bis R1-1805627, Apr. 16-20, 2018, p. 1.
3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.
3GPP, "3rd Generation Partnership Project; Technical Specification Group Radio Access Network; NR; Physical channels and modulation (Release 15)", 3GPP TS 38.211 V15.2.0, Jun. 2018, pp. 1-96.
3GPP, "3rd Generation Partnership Project; Technical Specification Group Radio Access Network; NR; Physical layer procedures for control (Release 15)", 3GPP TS 38.213 V15.2.0, Jun. 2018, pp. 1-99.
3GPP, "3rd Generation Partnership Project; Technical Specification Group Radio Access Network; NR; Physical layer procedures for data (Release 15)", 3GPP TS 38.214 V15.2.0, Jun. 2018, pp. 1-95.
Interdigial, Inc., "Power Control for NR DC", 3GPP TSG RAN WG1 RAN1#93 R1-1806967, May 21-25, 2018, pp. 1-4.
3GPP, "3rd Generation Partnership Project; Technical Specification Group Radio Access Network; NR; Radio Resource Control (RRC) protocol specification (Release 15)", 3GPP TS 38.331 V15.2.0, Jun. 2018, pp. 1-304.
Motorola Mobility, Lenovo, "Remaining details on CA-related NR UL power control", 3GPP TSG RAN WG1 #92bis R1-1807279, May 21-25, 2018, pp. 1-6.
3GPP, "3rd Generation Partnership Project; Technical Specification Group Radio Access Network; NR; Requirements for support of radio resource management (Release 15)", 3GPP TS 38.133 V15.2.0, Jun. 2018, pp. 1-79.
Interdigial, Inc., "Timing and Asynchronous Transmissions with Power Control for NR DC", 3GPP TSG RAN WG1 RAN1#93 R1-1806966, May 21-25, 2018, pp. 1-3.
3GPP, "3rd Generation Partnership Project; Technical Specification Group Radio Access Network; NR; User Equipment (UE) radio transmission and reception; Part 1: Range 1 Standalone (Release 15)", 3GPP TS 38.101-1 V15.2.0, Jun. 2018, pp. 1-126.
3GPP, "3rd Generation Partnership Project; Technical Specification Group Radio Access Network; Evolved Universal Terrestrial Radio Access (E-UTRA); User Equipment (UE) radio transmission and reception (Release 15)", 3GPP TS 36.101 V15.3.0, Jun. 2018, pp. 1-1696.
3GPP, "3rd Generation Partnership Project; Technical Specification Group Radio Access Network; Evolved Universal Terrestrial Radio Access (E-UTRA); Physical layer procedures (Release 15)", 3GPP TS 36.213 V15.2.0, Jun. 2018, pp. 1-541.
U.S. Appl. No. 16/537,359 "Office Action Summary", dated Nov. 12, 2020, pp. 1-43.
PCT/IB2019/000899, "International Search Report", PCT, dated Apr. 23, 2020, pp. 1-2.
PCT/IB2019/000899, "Written Opinion of the International Searching Authority", PCT, dated Apr. 23, 2020, pp. 1-6.
PCT/IB2019/000906, "Notification of Transmittal of the International Search Report and the Written Opinion of the International Searching Authority, or the Declaration", PCT, dated Jan. 20, 2020, pp. 1-43.
PCT/IB2019/000920, "Notification of Transmittal of the International Search Report and the Written Opinion of the International Searching Authority, or the Declaration", PCT, dated Jan. 24, 2020, pp. 1-43.
Huawei, Hisilicon, "Remaining details for uplink power control with CA", 3GPP TSG RAN WG1 Meeting #92 R1-1801808, Feb. 26-Mar. 2, 2018, pp. 1-6.

* cited by examiner

UPLINK TRANSMISSION POWER ALLOCATION

CROSS-REFERENCE TO RELATED APPLICATIONS

This application claims priority to U.S. Patent Application Ser. No. 62/716,923 entitled "APPARATUSES, METHODS, AND SYSTEMS FOR POWER CONTROL FOR DUAL CONNECTIVITY" and filed on Aug. 9, 2018 for Ebrahim MolavianJazi, which is incorporated herein by reference in its entirety.

FIELD

The subject matter disclosed herein relates generally to wireless communications and more particularly relates to uplink transmission power allocation.

BACKGROUND

The following abbreviations are herewith defined, at least some of which are referred to within the following description: Third Generation Partnership Project ("3GPP"), 4$^{th}$ Generation ("4G"), 5$^{th}$ Generation ("5G"), 5G System ("5GS"), Positive-Acknowledgment ("ACK"), Aggregation Level ("AL"), Access and Mobility Management Function ("AMF"), Access Network ("AN"), Angle of Arrival ("AoA"), Angle of Departure ("AoD"), Access Point ("AP"), Aperiodic SRS ("ap-SRS"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Component Carrier ("CC"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Cell Group ("CG"), Closed-Loop ("CL"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Device-to-Device ("D2D"), Discrete Fourier Transform Spread ("DFTS"), Dual Connectivity ("DC"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN") or ("EN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), Industrial IoT ("IIoT"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Master CG ("MCG"), Modulation Coding Scheme ("MCS"), Minimum Guaranteed Power ("MGP"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Multi-Radio Dual Connectivity ("MR-DC"), Machine Type Communication ("MTC"), Multiple TRPs ("multi-TRPs"), Multi User Shared Access ("MUSA"), Non Access Stratum ("NAS"), Narrowband ("NB"), Negative-Acknowledgment ("NACK") or ("NAK"), Network Entity ("NE"), Next Generation DC ("NE-DC"), Network Function ("NF"), Next Generation RAN ("NG-RAN"), Non-Orthogonal Multiple Access ("NOMA"), New Radio ("NR"), Network Repository Function ("NRF"), Non-standalone ("NSA"), Network Slice Instance ("NSI"), Network Slice Selection Assistance Information ("NSSAI"), Network Slice Selection Function ("NSSF"), Network Slice Selection Policy ("NSSP"), Non-Zero Power ("NZP"), Operation and Maintenance System ("OAM"), Orthogonal Frequency Division Multiplexing ("OFDM"), Open-Loop ("OL"), Other System Information ("OSI"), Power Amplifier ("PA"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Maximum UE Transmit Power ("Pcmax"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Path Loss ("PL"), Public Land Mobile Network ("PLMN"), Physical Random Access Channel ("PRACH"), Physical Resource Block ("PRB"), Primary Secondary Cell ("PSCell"), Periodic SRS ("p-SRS"), Physical Uplink Control Channel ("PUCCH"), Physical Uplink Shared Channel ("PUSCH"), Quasi Co-Located or Quasi Co-Location ("QCL"), Quality of Service ("QoS"), Quadrature Phase Shift Keying ("QPSK"), Registration Area ("RA"), Radio Access Network ("RAN"), Radio Access Technology ("RAT"), Random Access Channel ("RACH"), Random Access Preamble Identity ("RAPID"), Random Access Response ("RAR"), Resource Block ("RB"), Resource Element Group ("REG"), Rank Indicator ("RI"), Radio Link Control ("RLC"), Radio Link Monitoring ("RLM"), Radio Network Temporary Identifier ("RNTI"), Reference Signal or Reference Signals ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Secondary CG ("SCG"), Sparse Code Multiple Access ("SCMA"), Semi-persistent SRS ("sp-SRS"), Scheduling Request ("SR"), Sounding Reference Information ("SRI"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NSSAI"), Scheduling Request ("SR"), Shortened TTI ("sTTI"), Synchronization Signal ("SS"), Synchronization Signal Block ("SSB"), Supplementary Uplink ("SUL"), Single Uplink Operation ("SUO"), Subscriber Permanent Identifier ("SUPI"), Tracking Area ("TA"), Timing Advance Group ("TA"), TA Indicator ("TAI"), Transport Block ("TB"), Transport Block Size ("TBS"), Transmission Configuration Indicator ("TCI"), Time-Division Duplex ("TDD"), Time Division Multiplex ("TDM"), Time Division Orthogonal Cover Code ("TD-OCC"), Transmission Power Control ("TPC"), Transmitted Precoding Matrix Indicator ("TPMI"), Transmit Rank Indicator ("TRI"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, uplink transmission power may be limited. In such networks, it may be unknown how to limit the uplink transmission power.

BRIEF SUMMARY

Methods for uplink transmission power allocation are disclosed. Apparatuses and systems also perform the functions of the apparatus. One embodiment of a method includes receiving, by a user equipment, a configuration of a first uplink carrier and a second uplink carrier for a serving cell, wherein the first uplink carrier and the second uplink carrier are different. In certain embodiments, the method includes determining whether a configuration parameter corresponding to at least one of the first uplink carrier and the second uplink carrier for the serving cell is configured. In various embodiments, the method includes determining whether a total user equipment transmit power for uplink transmissions in a transmission occasion exceeds a maximum user equipment output power, wherein the uplink transmissions comprise a first uplink transmission on the first uplink carrier and a second uplink transmission. In some embodiments, the method includes, in response to determining that the total user equipment transmit power for uplink transmissions in the transmission occasion exceeds the maximum user equipment output power, determining a first priority level for the first uplink transmission and a second priority level for the second uplink transmission. In certain embodiments, the method includes, in response to determining the first priority level for the first uplink transmission and the second priority level for the second uplink transmission being the same and the configuration parameter not being configured for the first uplink carrier and the second uplink carrier, prioritizing power allocation for the first uplink transmission on the first uplink carrier.

One apparatus for uplink transmission power allocation includes a receiver that receives a configuration of a first uplink carrier and a second uplink carrier for a serving cell, wherein the first uplink carrier and the second uplink carrier are different. In some embodiments, the apparatus includes a processor that: determines whether a configuration parameter corresponding to at least one of the first uplink carrier and the second uplink carrier for the serving cell is configured; determines whether a total apparatus transmit power for uplink transmissions in a transmission occasion exceeds a maximum apparatus output power, wherein the uplink transmissions comprise a first uplink transmission on the first uplink carrier and a second uplink transmission; in response to determining that the total apparatus transmit power for uplink transmissions in the transmission occasion exceeds the maximum apparatus output power, determines a first priority level for the first uplink transmission and a second priority level for the second uplink transmission; and, in response to determining the first priority level for the first uplink transmission and the second priority level for the second uplink transmission being the same and the configuration parameter not being configured for the first uplink carrier and the second uplink carrier, prioritizes power allocation for the first uplink transmission on the first uplink carrier.

Another embodiment of a method for uplink transmission power allocation includes receiving, by a user equipment, a configuration of a first uplink carrier and a second uplink carrier for a serving cell, wherein the first uplink carrier and the second uplink carrier are different. In certain embodiments, the method includes determining whether a configuration parameter corresponding to at least one the first uplink carrier and the second uplink carrier for the serving cell is configured. In various embodiments, the method includes determining whether a power headroom report for the serving cell is to be based on an actual sounding reference signal transmission or a reference sounding reference signal transmission. In some embodiments, the method includes, in response to determining that the power headroom report for the serving cell is to be based on a reference sounding reference signal transmission, selecting an uplink carrier for power headroom computation from the first uplink carrier and the second uplink carrier based on whether the configuration parameter for the first uplink carrier and the second uplink carrier is configured. In certain embodiments, the method includes computing the power headroom report for the serving cell based on a reference sounding reference signal transmission on the uplink carrier.

Another apparatus for uplink transmission power allocation includes a receiver that receives a configuration of a first uplink carrier and a second uplink carrier for a serving cell, wherein the first uplink carrier and the second uplink carrier are different. In some embodiments, the apparatus includes a processor that: determines whether a configuration parameter corresponding to at least one the first uplink carrier and the second uplink carrier for the serving cell is configured; determines whether a power headroom report for the serving cell is to be based on an actual sounding reference signal transmission or a reference sounding reference signal transmission; in response to determining that the power headroom report for the serving cell is to be based on a reference sounding reference signal transmission, selects an uplink carrier for power headroom computation from the first uplink carrier and the second uplink carrier based on whether the configuration parameter for the first uplink carrier and the second uplink carrier is configured; and computes the power headroom report for the serving cell based on a reference sounding reference signal transmission on the uplink carrier.

One embodiment of a method for uplink transmission power allocation includes determining, at a user equipment, a transmission time for a first transmission. In certain embodiments, the method includes determining a first set of transmissions that overlap with the first transmission that start before a start time of the first transmission. In various embodiments, the method includes determining a cut-off time for power determination for the first transmission. In some embodiments, the method includes determining a second set of transmissions that overlap with the first transmission that start at or later than the start time of the first transmission, wherein scheduling information, transmission information, or a combination thereof for each transmission of the second set of transmissions is known at or before the cut-off time for power determination. In certain embodiments, the method includes determining a third set of transmissions that overlap with the first transmission that start at or later than the start time of the first transmission, wherein the scheduling information, the transmission information, or a combination thereof for each transmission of the third set of transmissions is known after the cut-off time for power determination. In various embodiments, the method includes allocating first transmission power for the first transmission based on a maximum total transmission power allocated to the first set of transmissions and a minimum guaranteed power corresponding to the second set of transmissions, the third set of transmissions, or some combination thereof. In some embodiments, the method includes performing the first transmission using the first transmission power.

One apparatus for uplink transmission power allocation includes a processor that: determines a transmission time for a first transmission; determines a first set of transmissions that overlap with the first transmission that start before a start time of the first transmission; determines a cut-off time for power determination for the first transmission; determines a second set of transmissions that overlap with the first transmission that start at or later than the start time of the first transmission, wherein scheduling information, transmission information, or a combination thereof for each transmission of the second set of transmissions is known at or before the cut-off time for power determination; determines a third set of transmissions that overlap with the first transmission that start at or later than the start time of the first transmission, wherein the scheduling information, the transmission information, or a combination thereof for each transmission of the third set of transmissions is known after the cut-off time for power determination; allocates first transmission power for the first transmission based on a maximum total transmission power allocated to the first set of transmissions and a minimum guaranteed power corresponding to the second set of transmissions, the third set of transmissions, or some combination thereof; and performs the first transmission using the first transmission power.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
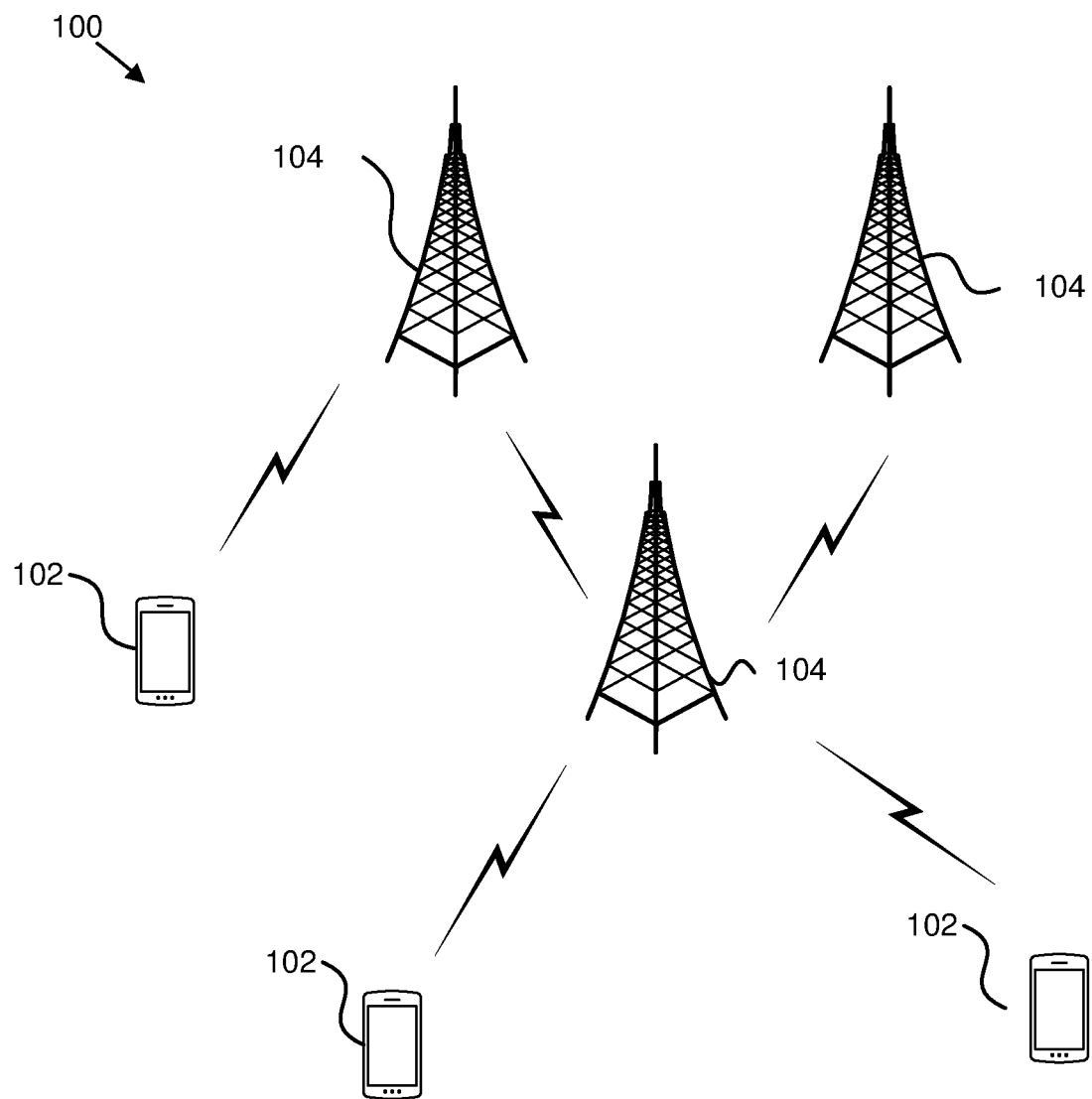
FIG. 1 is a schematic block diagram illustrating one embodiment of a wireless communication system for uplink transmission power allocation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for uplink transmission power allocation. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive a configuration of a first uplink carrier and a second uplink carrier for a serving cell, wherein the first uplink carrier and the second uplink carrier are different. In certain embodiments, the remote unit 102 may determine whether a configuration parameter corresponding to at least one of the first uplink carrier and the second uplink carrier for the serving cell is configured. In various embodiments, the remote unit 102 may determine whether a total user equipment transmit power for uplink transmissions in a transmission occasion exceeds a maximum user equipment output power, wherein the uplink transmissions comprise a first uplink transmission on the first uplink carrier and a second uplink transmission. In some embodiments, the remote unit 102 may, in response to determining that the total user equipment transmit power for uplink transmissions in the transmission occasion exceeds the maximum user equipment output power, determine a first priority level for the first uplink transmission and a second priority level for the second uplink transmission. In certain embodiments, the remote unit 102 may, in response to determining the first priority level for the first uplink transmission and the second priority level for the second uplink transmission being the same and the configuration parameter not being configured for the first uplink carrier and the second uplink carrier, prioritize power allocation for the first uplink transmission on the first uplink carrier. Accordingly, the remote unit 102 may be used for uplink transmission power allocation.

In another embodiment, a remote unit 102 may receive a configuration of a first uplink carrier and a second uplink carrier for a serving cell, wherein the first uplink carrier and the second uplink carrier are different. In certain embodiments, the remote unit 102 may determine whether a configuration parameter corresponding to at least one the first uplink carrier and the second uplink carrier for the serving cell is configured. In various embodiments, the remote unit 102 may determine whether a power headroom report for the serving cell is to be based on an actual sounding reference signal transmission or a reference sounding reference signal transmission. In some embodiments, the remote unit 102 may, in response to determining that the power headroom report for the serving cell is to be based on a reference sounding reference signal transmission, select an uplink carrier for power headroom computation from the first uplink carrier and the second uplink carrier based on whether the configuration parameter for the first uplink carrier and the second uplink carrier is configured. In certain embodiments, the remote unit 102 may compute the power headroom report for the serving cell based on a reference sounding reference signal transmission on the uplink carrier. Accordingly, the remote unit 102 may be used for uplink transmission power allocation.

In various embodiments, a remote unit 102 may determine a transmission time for a first transmission. In certain embodiments, the remote unit 102 may determine a first set of transmissions that overlap with the first transmission that start before a start time of the first transmission. In various embodiments, the remote unit 102 may determine a cut-off time for power determination for the first transmission. In some embodiments, the remote unit 102 may determine a second set of transmissions that overlap with the first transmission that start at or later than the start time of the first transmission, wherein scheduling information, transmission information, or a combination thereof for each transmission of the second set of transmissions is known at or before the cut-off time for power determination. In certain embodiments, the remote unit 102 may determine a third set of transmissions that overlap with the first transmission that start at or later than the start time of the first transmission, wherein the scheduling information, the transmission information, or a combination thereof for each transmission of the third set of transmissions is known after the cut-off time for power determination. In various embodiments, the remote unit 102 may allocate first transmission power for the first transmission based on a maximum total transmission power allocated to the first set of transmissions and a minimum guaranteed power corresponding to the second set of transmissions, the third set of transmissions, or some combination thereof. In some embodiments, the remote unit 102 may perform the first transmission using the first transmission power. Accordingly, the remote unit 102 may be used for uplink transmission power allocation.

Figure 2:
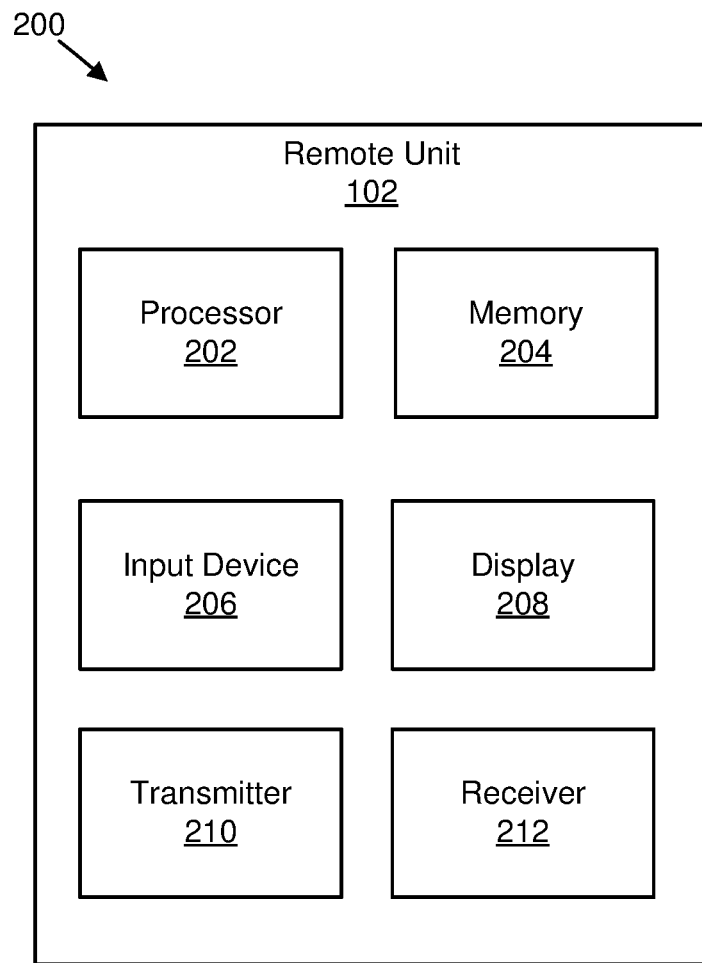
FIG. 2 is a schematic block diagram illustrating one embodiment of an apparatus that may be used for uplink transmission power allocation.

FIG. 2 depicts one embodiment of an apparatus 200 that may be used for uplink transmission power allocation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine whether a configuration parameter corresponding to at least one of the first uplink carrier and the second uplink carrier for the serving cell is configured; determine whether a total apparatus transmit power for uplink transmissions in a transmission occasion exceeds a maximum apparatus output power, wherein the uplink transmissions comprise a first uplink transmission on the first uplink carrier and a second uplink transmission; in response to determining that the total apparatus transmit power for uplink transmissions in the transmission occasion exceeds the maximum apparatus output power, determine a first priority level for the first uplink transmission and a second priority level for the second uplink transmission; and, in response to determining the first priority level for the first uplink transmission and the second priority level for the second uplink transmission being the same and the configuration parameter not being configured for the first uplink carrier and the second uplink carrier, prioritize power allocation for the first uplink transmission on the first uplink carrier.

In certain embodiments, the processor 202 may: determine whether a configuration parameter corresponding to at least one the first uplink carrier and the second uplink carrier for the serving cell is configured; determine whether a power headroom report for the serving cell is to be based on an actual sounding reference signal transmission or a reference sounding reference signal transmission; in response to determining that the power headroom report for the serving cell is to be based on a reference sounding reference signal transmission, select an uplink carrier for power headroom computation from the first uplink carrier and the second uplink carrier based on whether the configuration parameter for the first uplink carrier and the second uplink carrier is configured; and compute the power headroom report for the serving cell based on a reference sounding reference signal transmission on the uplink carrier.

In some embodiments, the processor 202 may: determine a transmission time for a first transmission; determines a first set of transmissions that overlap with the first transmission that start before a start time of the first transmission; determine a cut-off time for power determination for the first transmission; determine a second set of transmissions that overlap with the first transmission that start at or later than the start time of the first transmission, wherein scheduling information, transmission information, or a combination thereof for each transmission of the second set of transmissions is known at or before the cut-off time for power determination; determine a third set of transmissions that overlap with the first transmission that start at or later than the start time of the first transmission, wherein the scheduling information, the transmission information, or a combination thereof for each transmission of the third set of transmissions is known after the cut-off time for power determination; allocate first transmission power for the first transmission based on a maximum total transmission power allocated to the first set of transmissions and a minimum guaranteed power corresponding to the second set of transmissions, the third set of transmissions, or some combination thereof; and perform the first transmission using the first transmission power. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives a configuration of a first uplink carrier and a second uplink carrier for a serving cell, wherein the first uplink carrier and the second uplink carrier are different. In certain embodiments, the receiver 212 receives a configuration of a first uplink carrier and a second uplink carrier for a serving cell, wherein the first uplink carrier and the second uplink carrier are different.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
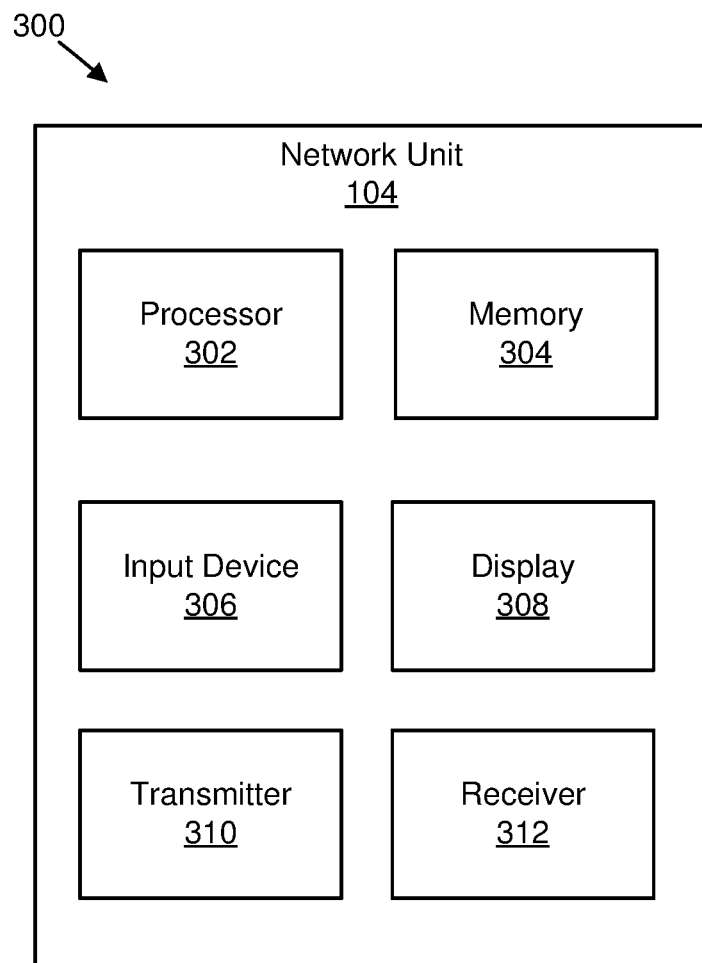
FIG. 3 is a schematic block diagram illustrating one embodiment of an apparatus that may be used for uplink transmission power allocation.

FIG. 3 depicts one embodiment of an apparatus 300 that may be used for uplink transmission power allocation. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, DC may be a framework in wireless communications that facilitates a connection of a device or UE to a collection of serving cells or CCs among which an ideal, high-capacity, and/or low-latency backhaul may not exist or cannot be assumed. Certain embodiments for dual connectivity may use a connection of a UE to both macro cells and small cells that may not be tightly connected. In various embodiments, inter-band DC may be used. In some embodiments, DC may include a connection of a UE to two different RATs. In certain embodiments, both inter-band and intra-band DC may be used.

In certain embodiments, DC may use two serving cells or CGs. In such embodiments, the serving cells or CCs may be collocated and/or synchronized. Thus, synchronous CA may be supported within each CG. In such embodiments, the CCs may be non-collocated and belong to different TAGs but the two CGs may be connected via a non-ideal, low-capacity, and/or not-so-low-latency backhaul. The CG that a UE first connects to and takes a role of main established connection is called an MCG, and the other CG that the UE later connects to and takes the role of supplemental connection is called an SCG. The MCG may be governed by a master eNB and/or gNB, and the SCG may be governed by a secondary eNB and/or gNB. The two CGs may use the same RAT (e.g., for LTE-DC (such as DC to two LTE CGs), for NR-DC (such as DC to two NR CGs)), or may use different RATs (e.g., EN-DC (such as DC with an LTE MCG and an NR SCG, or NR NSA architecture option 3) or NE-DC (such as DC with an NR MCG and an LTE SCG, or NR NSA architecture option 4). In some embodiments, the EN-DC and NE-DC architectures may be collectively referred to as MR-DC.

Various embodiments, such as LTE, may use: (i) a fixed 15 kHz SCS for OFDM operation; (ii) a fixed timeline in which an uplink grant or downlink assignment for a transmission always arrives (e.g., 4 subframes beforehand); (iii) a fixed (e.g., 4 subframe) timeline for processing and/or preparation of a transmission; and (iv) a restricted set of transmission time intervals and/or durations within a subframe. Certain embodiments, such as NR, may enable: (i) configurable SCS and/or numerology; (ii) configurable grant-to-transmission time (e.g., delay between DCI received in an original BWP, and scheduled PUSCH in a target BWP) and/or self-contained slots; (iii) a minimum preparation time depending on a numerology and a UE capability for which an actual UE preparation time may be the same as or larger than the minimum preparation time; and (iv) one or multiple mini-slots or PUSCH mapping (e.g., type-B).

In some embodiments, PC may be one area in a UE physical layer (e.g., L1) operation that is affected by DC. Described herein are various PC related configuration and/or operation methods for NR-DC and/or MR-DC. In certain embodiments, aspects related to different and/or configurable numerologies between CGs, different and/or configurable processing times, and/or multiple (or partial) overlaps between CGs may be considered. Described herein are various power control, PHR, beam indication, and/or UL MIMO aspects.

Certain embodiments described herein apply generally to UL transmissions. As may be appreciated, UL transmissions may include PUSCH, PUCCH, SRS, or PRACH transmissions.

In one embodiment, a UE may be configured with synchronous NR-DC operation if a maximum uplink timing difference between two CGs is no more than a fixed threshold [X]. In other words, slot boundaries for a CG with a lower SCS may be offset by no more than the fixed threshold [X] with respect to the slot boundaries for some slot (e.g., every [M] slots, if [M] is the ratio between the two SCS values for the two CGs) in the other CG with a higher SCS. In one example, the fixed threshold [X] is the time duration (e.g., in microseconds) equivalent to half a symbol of the CG with the higher SCS. In another example, the fixed threshold [X] is the time duration (e.g., in microseconds) equivalent to half a symbol of the CG with the lower SCS. In yet another example, the fixed threshold [X] is the time duration (e.g., in microseconds) equivalent to half a symbol of the CG with a default SCS (e.g., 15 kHz) such as X=33 microseconds, as in LTE.

In one embodiment, a UE may be configured with an asynchronous NR-DC operation if a maximum uplink timing difference between the two CGs is more than a fixed threshold [X] and no more than another fixed threshold [Y]. In other words, the slot boundaries for the CG with lower SCS may be offset by more than a fixed threshold [X] and no more than another fixed threshold [Y] with respect to the slot boundaries for some slot (e.g., every [M] slots, if [M] is the ratio between the two SCS values for the two CGs) in the other CG with higher SCS. In one example, the fixed threshold [X] is the time duration (e.g., in microseconds) equivalent to half a symbol of the CG with the higher, lower, and/or default SCS, and the fixed threshold [Y] is the time duration (e.g., in microseconds) equivalent to half a slot of the CG with the higher, lower, and/or default SCS.

In certain embodiments, such as for a UE configured with two CGs and for overlapping uplink transmission occasions between two CGs with the same numerology, the same starting time, and/or the same transmission duration, if the UE is power limited due to simultaneous transmission occasions on the two CGs so that the total transmission power across the two CGs exceeds Pcmax, scaling and/or dropping may be applied to a lowest priority transmission first until a total power and/or aggregated power in every symbol of all transmission occasions are within Pcmax, but the MGP of each CG may also be guaranteed so that each CG receives at least up to its MGP, and if there is MGP leftover, any and all transmissions of a CG with a lower priority may receive power allocation up to the MGP of that CG. Exact power scaling or dropping for any transmissions may be left to UE implementation. In some embodiments, the priority levels may be defined as follows: PRACH>PUCCH and/or PUSCH with ACK/NACK and/or SR>PUCCH and/or PUSCH with other UCIs (e.g., CSI) >PUSCH without UCI>SRS; within a same priority level, MCG may be prioritized over SCG; and within a same priority level and within a cell group, the same priority rules as for CA.

In some embodiments, before allocating power to any given priority level, a transmission power for the following may be allocated first: all transmissions within the same CG with a higher priority; all transmissions of other CGs with a higher priority; and/or all transmissions of other CGs with a lower priority up to an MGP of the other CGs, if there is MGP leftover.

In various embodiments, a UE may allocate up to a remaining power (e.g., {Pcmax,DC−certain power allocations} for a priority level of interest), where "Pcmax,DC" is shorthand for maximum transmit power for dual connectivity. If a required power for transmission of signals and/or channels in a priority level of interest exceeds {Pcmax,DC−certain power allocations}, then a power scaling or dropping may be applied to that priority level so that a remaining power is not exceeded. Exact scaling or dropping may be determined by UE implementation. In some embodiments, an MGP of a CG may be defined as a semi-static fraction (e.g., $\gamma\_MCG$ or $\gamma\_SCG$) of a dual-connectivity Pcmax, so $MGP\_CG1[i1,i2]=\gamma\_CG1 \times Pcmax(i1,i2)$, and $MGP\_CG2[i1,i2]=\gamma\_CG2 \times Pcmax(i1,i2)$.

As may be appreciated, various embodiments described herein may apply to both synchronous and asynchronous NR-DC and/or to NR-CA (e.g., cut-off time, transmission categories, etc., but not MGP aspects).

In one embodiment, for a UE configured with two CGs and for overlapping uplink transmission occasions between two CGs with the same or different numerologies, the same or different starting times, and/or the same or different transmission durations, if the UE is power limited due to simultaneous transmission on the two CGs so that the total transmission power across the two CGs exceeds Pcmax, scaling and/or dropping may be applied to a lowest priority first until the total and/or aggregated power in every symbol of all transmission occasions are within Pcmax, but the MGP of each CG may also be guaranteed so that each CG receives at least up to its MGP, and if there is MGP leftover, any and all transmissions of a CG with a lower priority may receive power allocation up to the MGP of that CG. Exact scaling and/or dropping of the whole or parts of any transmission may be left to a UE implementation. Priority levels may be defined as follows: PRACH>PUCCH and/or PUSCH with ACK/NACK and/or SR>PUCCH and/or PUSCH with other UCIs (e.g., CSI)>PUSCH without UCI>SRS; within a same priority level, MCG may be prioritized over SCG; and/or within a same priority level and within a cell group, the same priority rules as for CA.

In certain embodiments, there may be no "look-ahead" (e.g., no dynamic look ahead), so that if determining a total transmit power in a symbol of a transmission occasion i on the same CG and/or the other CG, a UE does not include power for transmissions starting after the symbol of transmission occasion i on the same CG or the other CG. In one embodiment, if a UE knows it does not have transmission in the other CG in overlapped transmission occasion based on at least semi-static information (e.g., TDD UL and/or DL config), the UE may determine the total transmit power in a symbol.

As may be appreciated, NR may define flexible and/or configurable options for numerology, transmission duration, grant-to-transmission delay, and/or processing time (e.g., minimum processing time).

In some embodiments, a UE transmit power on a first cell group (e.g., CG1) in a transmission occasion [i1] may be determined as follows: 1) consider a start time of the transmission occasion [i1] on CG1; 2) consider a power control cut-off time for the transmission occasion [i1] on CG1; 3) consider three categories (e.g., Category 0, Category 1, Category 2) for overlapping transmissions as follows.

Category 0 transmissions: any and all [M] transmission occasions [i2,0,1], . . . [i2,0,M0] on a second CG (e.g., CG2) that (i) start before the start time of the transmission occasion [i1] on CG1; and (ii) overlap with the transmission occasion [i1]. Here, M0≥0 is an integer number.

Category 1 transmissions: any and all transmission occasions [i2,1,1], . . . , [i2,1,M1] on the second CG that (i) start on or after the start time of the transmission occasion [i1] on CG1; (ii) overlap with transmission occasion [i1]; and (iii) whose processed downlink control information and/or UL grant (e.g., in a PDCCH occasion), processed configured UL grant (e.g., time needed to process can be PUSCH preparation time in which PUSCH preparation time includes DCI decoding delay and PUSCH TB preparation, and may be based on UE capability), or processed higher-layer signaling such as successfully received RRC signaling or activated MAC-CE signaling (e.g., process time may include x (e.g., 2 ms) after a slot in which the UE transmits HARQ-ACK information for the PDSCH providing the MAC-CE signaling) arrive before or on the power control cut-off time for transmission occasion [i1] on CG1. Here, M1≥0 is an integer number.

In some embodiments, a minimum UE processing time to prepare a PUSCH transmission or PUSCH preparation time may be defined such as follows. If the first uplink symbol in the PUSCH allocation, including the DM-RS, as defined by the slot offset $K_2$ and the start and length indicator SLIV of the scheduling DCI, is no earlier than at symbol $L_2$ then the UE shall transmit PUSCH where $L_2$ is defined as the next uplink symbol with its CP starting $T_{proc,2}=\max((N_2+d_{2,1}+d_{2,2})(2048+144)\cdot\kappa 2^{-\mu}\cdot T_C, d_{2,3})$ after the end of the last symbol of the PDCCH carrying the DCI scheduling the PUSCH, where: a) $N_2$ is based on μ of Table 1 and Table 2 for UE processing capability 1 and 2 respectively, where u corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_L$ corresponds to the subcarrier spacing of the uplink channel with which the PUSCH is to be transmitted, and κ is defined in TS 38.211; b) If the first symbol of the PUSCH allocation consists of DM-RS only, then $d_{2,1}=0$, otherwise $d_{2,1}=1$; c) If the HARQ-ACK is multiplexed on PUSCH, then $d_{2,2}=1$, otherwise $d_{2,2}=1$; d) If the UE is configured with multiple active component carriers, the first uplink symbol in the PUSCH allocation further includes the effect of timing difference between component carriers as given in TS 38.133; e) If the scheduling DCI triggered a switch of BWP, $d_{2,3}$ equals to the switching time as defined in [11, TS 38.133], otherwise $d_{2,3}=0$. Otherwise the UE may ignore the scheduling DCI. The value of $T_{proc,2}$ is used both in the case of normal and extended cyclic prefix.

TABLE 1

| μ | PUSCH preparation time $N_2$ [symbols] |
|---|---|
| 0 | 10 |
| 1 | 12 |
| 2 | 23 |
| 3 | 36 |

TABLE 2

| μ | PUSCH preparation time $N_2$ [symbols] |
|---|---|
| 0 | 5 |
| 1 | 5.5 |
| 2 | 11 for frequency range 1 |

Category 2 transmissions: any and all transmission occasions [i2,2,1], . . . , [i2,2,M2] on the second CG that (i) start on or after the start time of the transmission occasion [i1] on CG1; (ii) overlap with transmission occasion [i1]; and (iii) whose processed downlink control information and/or UL grant (e.g., in a PDCCH occasion) (e.g., DCI time instance plus some [N] symbols and/or slots, minimum PUSCH preparation time), processed configured UL grant, or processed higher-layer signaling such as successfully received RRC signaling or activated MAC-CE signaling (e.g., after [X] ms activation time, such as X=3) arrive after the power control cut-off time for transmission occasion [i1] on CG1. Here, M2≥0 is an integer number.

The UE transmit power on the first cell group in the transmission occasion [i1] may continue to be determined as follows: 4) to determine the power allocation for transmission occasion [i1] on CG1, the following power allocations may be performed first: a) the total and/or aggregate power that is already allocated to Category 0 transmissions on CG2; b) the power for PRACH on CG2 in any of the transmission occasions [i2,2,1], . . . , [i2,2,M2] of Category 2 transmissions, or the MGP for CG2, whichever is larger. If the UE is not ready for a PRACH transmission at least [N] (e.g., N=1, or N>1 configured or specified) slots and/or symbols (in terms of the numerology of a BWP [b] of a cell and/or carrier [c/f] of a CG (e.g., CG2)) beforehand, then the PRACH-based power reduction may not be needed. If semi-static "look-ahead" determines that there cannot be any UL transmissions in a transmission occasion on CG2 (e.g., if it is a DL slot for CG2 in a TDD operation), the MGP-based power reduction may not be needed for that transmission occasion. In one example, if the UE knows it does not have transmission in the second CG in an overlapped transmission occasion based on at least semi-static information (e.g., TDD UL and/or DL config.), the UE does not reserve the power for that CG.

The UE transmit power on the first cell group in the transmission occasion [i1] may continue to be determined as follows: 5) the remaining power {Pcmax,DC−certain power allocations} is then allocated to the transmission occasion [i1] on CG1 and of Category 2 transmission occasions [i2,1,1], . . . , [i2,1,M1] on CG2 as follows: a) priority levels and rules are considered the same way and/or similar to LTE-DC and NR-CA; PRACH>PUCCH and/or PUSCH with HARQ/ACK and/or SR>PUSCH and/or PUCCH with other UCI (e.g., CSI report)>PUSCH and/or PUCCH without any UCI>SRS; within the same priority level, MCG>SCG; and within a same priority level and within a cell group, the same priority rules as for CA; b) to determine the transmission power allocation for any given priority level on CG1 or CG2, the transmission power for the following are allocated first: all transmissions within the same CG with a higher priority; all transmissions of the second CG with a higher priority; all transmissions of the second CG with a lower priority up to the MGP of the second CG, if there is MGP leftover; c) Next, the UE may allocate up to a power limit: {Remaining power−certain power allocations} for the priority level of interest, where "Remaining power" may be defined as described herein. If the required power for transmission of the signals and/or channels in the priority level of interest exceeds the power limit {Remaining power–certain power allocations}, then power scaling and/or dropping may be applied to that priority level so that the power limit is not exceeded. Exact scaling and/or dropping of the whole or parts of any transmission may be made based on UE implementation.

As may be appreciated, for power allocation to a transmission occasion (e.g., [i1]) on a first cell group (e.g., CG1), different power allocation behavior and/or operations may be defined for transmission occasions on a second cell group (e.g., CG2) before and after a certain "cut-off" time, as defined in Category 1 and Category 2 transmissions. As used herein, "cut-off" time may be defined in a variety of ways as will be described in greater detail.

In one embodiment, the "cut-off" time for power allocation to a transmission occasion [i1] on a cell group CG1 in NR-DC power control with look-ahead (that defines and distinguishes Category 1 and Category 2 transmissions) may be defined as follows: 1) the transmission time for transmission occasion [i1] on CG1 (e.g., no look-ahead and/or semi-static look-ahead); 2) the transmission time for transmission occasion [i1] on CG1 minus a predefined or configured number of symbols and/or slots (e.g., as an offset) that may depend on one or more factors (e.g., UE processing time, UE minimum processing time, PUSCH and/or PUCCH preparation time, minimum PUSCH and/or PUCCH preparation time, K_PUSCH, K_PUCCH, K_SRS (e.g., defined based on agreements and/or specification text), PA adjustment time, or a function of any, some or all factors, etc.); 3) the time instance that the LCP and/or TB generation for transmission occasion [i1] on CG1 starts (e.g., may be UE implementation-specific); 4) the time instance that an UL grant (e.g., downlink control information such as via format 0_0 or 0_1) or a downlink assignment is received for the transmission occasion [i1] on CG1; 5) the UL grant, DCI, or downlink assignment reception time instance plus a predefined or configured number of symbols and/or slots (e.g., as an offset) that may depend on one or more factors (e.g., UE processing time, UE minimum processing time, PUSCH and/or PUCCH preparation time, minimum PUSCH and/or PUCCH preparation time, K_PUSCH, K_PUCCH, K_SRS, PA adjustment time, or a function of any, some or all factors, etc.).

For various examples of "cut-off" time described herein, a "time" or "time instance" may be a pure analog time, or a slot index and/or a symbol index in terms of numerology of a BWP [b] of a cell/carrier [c/f] of a CG (e.g., CG1).

Figure 4:
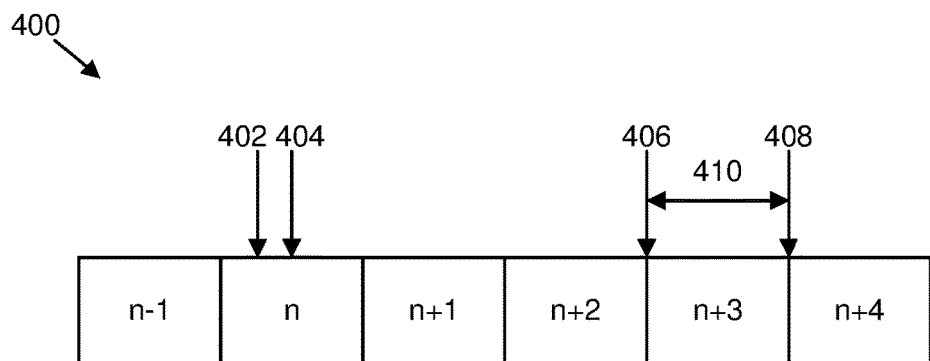
FIG. 4 is a schematic block diagram illustrating a first embodiment of a "cut-off" time in a first cell group.

FIG. 4 is a schematic block diagram illustrating a first embodiment of a "cut-off" time in a first cell group 400. The first cell group 400 includes a first set of symbols or a first slot (n−1), a second set of symbols or a second slot (n), a third set of symbols or a third slot (n+1), a fourth set of symbols or a fourth slot (n+2), a fifth set of symbols or a fifth slot (n+3), and a sixth set of symbols or a sixth slot (n+4). A first time 402 indicates a start of PDCCH carrying a PUSCH grant, and a second time 404 indicates an end of the PDCCH. A third time 406 indicates a "cut-off" time (e.g., a latest time for a UE to change a TX power setting), and a fourth time 408 indicates a start time for PUSCH. A time period 410 indicates a PUSCH preparation time.

Figure 5:
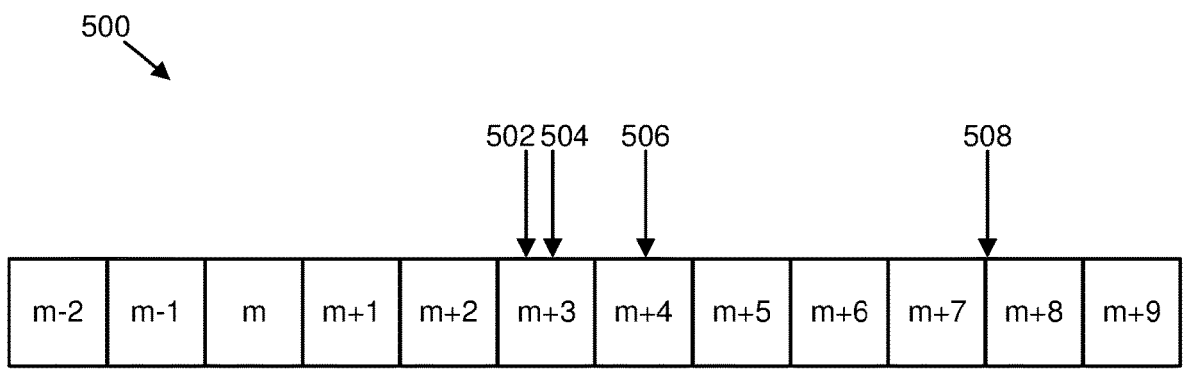
FIG. 5 is a schematic block diagram illustrating a second embodiment of a "cut-off" time in a second cell group.

FIG. 5 is a schematic block diagram illustrating a second embodiment of a "cut-off" time in a second cell group 500. The second cell group 500 includes a first set of symbols (m−2), a second set of symbols (m−1), a third set of symbols (m), a fourth set of symbols (m+1), a fifth set of symbols (m+2), a sixth set of symbols (m+3), a seventh set of symbols (m+4), an eighth set of symbols (m+5), a ninth set of symbols (m+6), a tenth set of symbols (m+7), an eleventh set of symbols (m+8), and a twelfth set of symbols (m+9). A first time 502 indicates a start of PDCCH carrying a PUSCH grant, and a second time 504 indicates an end of the PDCCH. A third time 506 indicates a "cut-off" or "PDCCH decoding" time from the end of the PDCCH (e.g., an earliest time for a UE to obtain information on PUSCH from the PDCCH), and a fourth time 508 indicates a start time for PUSCH. The third time 506 in the second cell group is before the "cut-off" time 406 for the PUSCH transmission on the first cell group.

Figure 6:
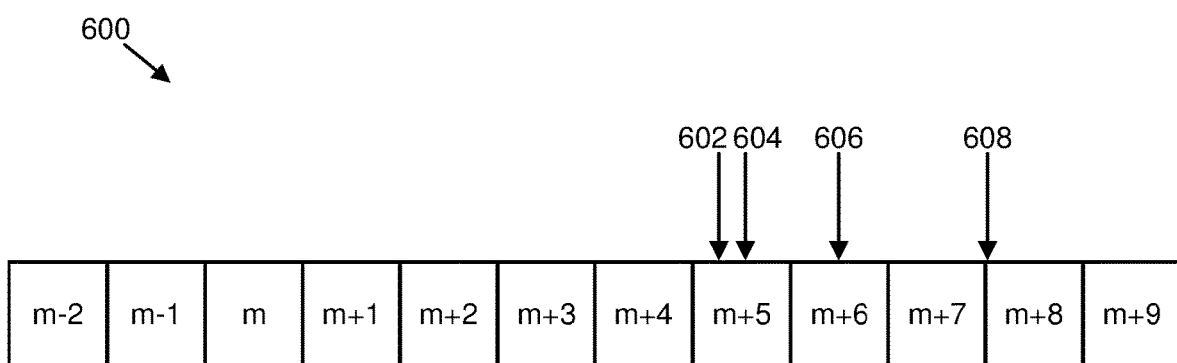
FIG. 6 is a schematic block diagram illustrating a third embodiment of a "cut-off" time in a second cell group.

FIG. 6 is a schematic block diagram illustrating a third embodiment of a "cut-off" time in a second cell group 600. The second cell group 600 includes a first set of symbols (m−2), a second set of symbols (m−1), a third set of symbols (m), a fourth set of symbols (m+1), a fifth set of symbols (m+2), a sixth set of symbols (m+3), a seventh set of symbols (m+4), an eighth set of symbols (m+5), a ninth set of symbols (m+6), a tenth set of symbols (m+7), an eleventh set of symbols (m+8), and a twelfth set of symbols (m+9). A first time 602 indicates a start of PDCCH carrying a PUSCH grant, and a second time 604 indicates an end of the PDCCH. A third time 606 indicates a "cut-off" or "PDCCH decoding" time from the end of the PDCCH (e.g., an earliest time for a UE to obtain information on PUSCH from the PDCCH), and a fourth time 508 indicates a start time for PUSCH. The third time 606 in the second cell group is after the "cut-off" time 406 for the PUSCH transmission on the first cell group.

Figure 7:
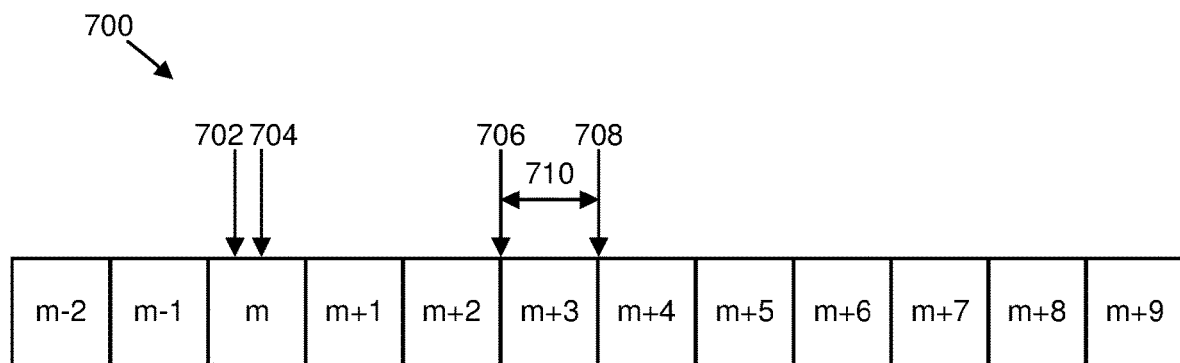
FIG. 7 is a schematic block diagram illustrating a fourth embodiment of a "cut-off" time in a first cell group.

FIG. 7 is a schematic block diagram illustrating a fourth embodiment of a "cut-off" time in a first cell group 700. The first cell group 700 includes a first set of symbols (m−2), a second set of symbols (m−1), a third set of symbols (m), a fourth set of symbols (m+1), a fifth set of symbols (m+2), a sixth set of symbols (m+3), a seventh set of symbols (m+4), an eighth set of symbols (m+5), a ninth set of symbols (m+6), a tenth set of symbols (m+7), an eleventh set of symbols (m+8), and a twelfth set of symbols (m+9). A first time 702 indicates a start of PDCCH carrying a PUSCH grant, and a second time 704 indicates an end of the PDCCH. A third time 706 indicates a "cut-off" time (e.g., a latest time for a UE to change a TX power setting), and a fourth time 708 indicates a start time for PUSCH. A time period 710 indicates a PUSCH preparation time.

Figure 8:
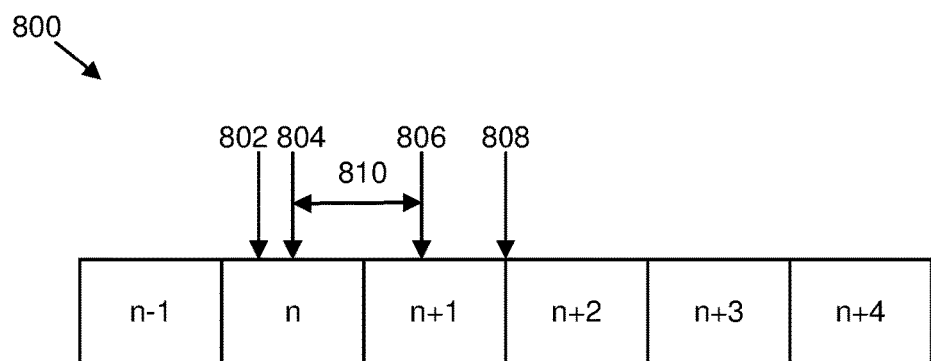
FIG. 8 is a schematic block diagram illustrating a fifth embodiment of a "cut-off" time in a second cell group.

FIG. 8 is a schematic block diagram illustrating a fifth embodiment of a "cut-off" time in a second cell group 800. The second cell group 800 includes a first set of symbols (n−1), a second set of symbols (n), a third set of symbols (n+1), a fourth set of symbols (n+2), a fifth set of symbols (n+3), and a sixth set of symbols (n+4). A first time 802 indicates a start of PDCCH carrying a PUSCH grant, and a second time 804 indicates an end of the PDCCH. A third time 806 indicates a "cut-off" time (e.g., an earliest time for a UE to obtain information on PUSCH), and a fourth time 808 indicates a start time for PUSCH. A time period 810 indicates a PUSCH preparation time.

As may be appreciated, an MGP for a CG may be a critical element of power control for DC to ensure that no CG is deprived of at least some amount and/or fraction of UE transmit power. In some embodiments, if a transmission occasion [i1] of CG1 does not overlap with any transmission occasions on CG2, there may be no DC-based power limitation; therefore, Pcmax,DC and MGP may not be applicable.

In one embodiment, if a transmission occasion [i1] of CG1 overlaps only with a single transmission occasion (e.g.,

[i2]) on CG2, then the MGP for the cell groups may be defined as $MGP\_CG1[i1,i2]=\gamma\_CG1 \times Pcmax(i1,i2)$, and $MGP\_CG2[i1,i2]=\gamma\_CG2 \times Pcmax(i1,i2)$, where $Pcmax(i1,i2)$ is the dual-connectivity Pcmax, such as defined in TS 38.101, and $\gamma\_CG1$ and $\gamma\_CG2$ may be semi-statically (e.g., RRC) configured fractions, such as those in LTE-DC PCM1 and PCM-2 per TS 36.213.

In certain embodiments, if a transmission occasion [i1] of CG1 overlaps only with multiple transmission occasion (e.g., [i2_1], . . . , [i2_N] with N≥2) on CG2, then the MGP for the cell groups may be defined based on at least one the following options: a) $MGP\_CG1[i1,\{i2\_1, \ldots, i2\_N\}]=\gamma\_CG1 \times max\{Pcmax(i1,i2\_1), \ldots, Pcmax(i1,i2\_N)\}$; b) $MGP\_CG1[i1,\{i2\_1, \ldots, i2\_N\}]=\gamma\_CG1 \times min\{Pcmax(i1,i2\_1), \ldots, Pcmax(i1,i2\_N)\}$; c) $MGP\_CG1[i1,\{i2\_1, \ldots, i2\_N\}]=\gamma\_CG1 \times Pcmax(i1,i2\_1)$ if transmission occasion [i2_1] on CG2 starts at the same symbol/time that transmission occasion [i1] of CG1 does; otherwise $MGP\_CG1[i1,\{i2\_1, \ldots, i2\_N\}]=\gamma\_CG1 \times Pcmax(i1)$, where $Pcmax(i1)$ is the (regular, non-DC) Pcmax used for CG1; d) $MGP\_CG1[i1,\{i2\_1, \ldots, i2\_N\}]=\gamma\_CG1 \times Pcmax(i1,i2\_J)$, where [J] is a predefined/configured index, e.g., J=1 or J=N; e) $MGP\_CG1[i1,\{i2\_1, \ldots, i2\_N\}]=\gamma\_CG1 \times Pcmax(i1,i2\_J)$, where $1 \leq [J] \leq N$ is the index for the transmission occasion on CG2 that has the highest L1 priority level based on the NR-CA priority list, such as defined in TS 38.213. If there are multiple such transmission occasions on CG2 with the same highest L1 priority level, then [J] may be selected to be the (i) the smallest one, (ii) the largest one, or (iii) an arbitrary one of the indices among those transmission occasions. As may be appreciated, certain benefits of options a) and b) include that a certain (e.g., very loose or very stringent) power level may be guaranteed as MGP for a CG; however, a drawback of options a) and b) may be that a UE needs to compute all [N] dual-connectivity Pcmax,DC values for any and/or each MGP determination instance. Furthermore, certain benefits of options c), d), and e) include that only one dual-connectivity Pcmax,DC value may be computed for any and/or each MGP determination instance.

In certain embodiments, because a dual-connectivity Pcmax,DC value may be computed for a CG only if the details of grant, assignment, and/or transmission (e.g., RB allocation) are known to a UE at the time of the Pcmax,DC computation, only transmission occasions $\{i2\_1, \ldots, i2\_L\}$ with $[L] \leq [N]$ on CG2 may be considered for an MGP determination in various options. For example, $\{i2\_1, \ldots, i2\_L\}$ may be only Category 0 transmissions as described herein (e.g., only transmission occasions on CG2 that have started before transmission occasion [i1] on CG1). In another example, determination of [L] may be based on a certain "cut-off" time (e.g., only transmission occasions before a certain "cut-off" time). In a further example, $\{i2\_1, \ldots, i2\_L\}$ may be only Category 1 transmissions as described herein. In yet another example, $\{i2\_1, \ldots, i2\_L\}$ may be only Category 0 and Category 1 transmissions as described herein.

In various embodiments, such as in LTE-NR NSA architecture option 3 (e.g., known as EUTRA-NR dual connectivity or EN-DC), in which LTE is the MCG and NR is the SCG, power sharing may be performed based on a maximum configured power level for LTE (e.g., P_LTE) and a maximum configured power level for NR (e.g., P_NR), and by adopting one the following methods: 1) Semi-static power sharing: if P_LTE+P_NR≤P_{EN-DC, total}, no power sharing is needed; 2) Dynamic power sharing: if P_LTE+P_NR>P_{EN-DC, total} and the UE is capable of dynamic power sharing, then the power setting for LTE (which is the MCG) is not changed, and if there is power-limitation, NR (which is the SCG) scales down power or drops transmission; 3) Single uplink operation (SUO): if P_LTE+P_NR>P_({EN-DC, total} and the UE is not capable of dynamic power sharing, then the UE is configured with a reference DL and/or UL TDD subframe structure (even for an FDD cell), and LTE may only make UL transmissions on the designated UL subframes for LTE on which NR is not allowed to make any UL transmission, and NR may only make UL transmission on the designated DL subframes for LTE.

In some embodiments, such as in LTE-NR NSA architecture option 4 (e.g., known as NR-EUTRA dual connectivity or NE-DC), in which NR is the MCG and LTE is the SCG, power sharing between NR and LTE may be specified. In such embodiments, a difference between EN-DC and NE-DC may be that because LTE processing time is the same or slower than NR processing time, once LTE power is decided LTE may no more adjust its power based on any NR grants and/or transmissions that are later received and processed. Thus, power scaling for LTE to accommodate an NR transmission (as MCG) may not be possible unless for the special case that NR is as slow as LTE. Therefore, only dropping and/or stopping LTE may be an option. This may be similar to an operation in which legacy LTE collides with short-processing (e.g., sTTI LTE).

In certain embodiments, for an NE-DC operation a configured MGP for LTE may be reserved because devices and/or networks already support LTE. As may be appreciated, for EN-DC, no MGP may be used for NR because LTE may be considered to always have a higher priority and it may be assumed that in many UEs and network deployments the LTE part may not be aware of the NR side, and may not be affected by NR; however, for NE-DC, it may be valid to assume that NR is aware of the LTE presence and may reserve some configured MGP for LTE operation.

In various embodiments that follow, it may be assumed that P_{NE-DC, Total}=P_{EN-DC, Total}; otherwise, an appropriate configured value may be used.

In one embodiment, for NE-DC operation, if P_LTE+P_NR>P_{EN-DC, total}, and if a UE indicates a certain capability for dynamic NE-DC power sharing in which NR processing time is configured to be as slow as LTE (e.g., legacy LTE, short-processing LTE, or sTTI LTE, whichever the UE is configured with): if the UE transmissions in slot $i_1$ of the MCG (i.e., NR) overlap in time with UE transmissions in subframe $i_2$ of the SCG (i.e., LTE), and if $\hat{P}_{MCG}(i_1)+\hat{P}_{SCG}(i_2)>\hat{P}_{Total}^{EN-DC}$ in any portion of subframe $i_2$ of the SCG (e.g., LTE), then the UE reduces transmission power in any portion of subframe $i_2$ of the SCG (e.g., LTE) so that $\hat{P}_{MCG}(i_1)+\hat{P}_{SCG}(i_2) \leq \hat{P}_{Total}^{EN-DC}$ in any portion of subframe $i_2$, where $\hat{P}_{MCG}(i_1)$ and $\hat{P}_{SCG}(i_2)$ are the linear values of the total UE transmission powers in slot $i_1$ of the MCG and in subframe $i_2$ of the SCG, respectively.

In another embodiment, for NE-DC operation, if P_LTE+P_NR>P_({EN-DC, total}, and if NR processing time is configured to be faster than LTE (e.g., legacy LTE, short-processing LTE, or sTTI LTE, whichever the UE is configured with): if the UE transmissions in slot $i_1$ of the MCG (e.g., NR) overlap in time with UE transmissions in subframe $i_2$ of the SCG (e.g., LTE), and if $\hat{P}_{MCG}(i_1)+\hat{P}_{SCG}(i_2)>\hat{P}_{Total}^{EN-DC}$ in any portion of subframe $i_2$ of the SCG, then the UE drops the transmission in any portion of subframe $i_2$ of the SCG or stops the transmission of subframe $i_2$ of the SCG (e.g., LTE).

In some embodiments, for NE-DC operation, if P_LTE+P_NR>P_({EN-DC, total}, and if a UE is configured with a reference TDD subframe structure configuration for the SCG (e.g., LTE), then the UE is not expected to transmit in a slot on the MCG (e.g., NR) if a corresponding subframe on the SCG (e.g., LTE) is an UL subframe in the reference TDD configuration.

In certain embodiments, for NE-DC operation, if the UE is configured with the same numerology for both LTE and NR, if P_LTE+P_NR>P_({EN-DC, total}, and if the UE is configured with a reference TDD subframe structure configuration for the MCG (e.g., NR), then the UE is not expected to transmit in a subframe on the SCG (e.g., LTE) if a corresponding slot on the MCG (e.g., NR) is an UL slot in the reference TDD configuration.

In various embodiments, for NE-DC operation, a UE may be semi-statically configured with an MGP fraction, denoted by $\gamma\_LTE$ or $\gamma\_EUTRA$. If the UE transmissions in slot $i_1$ of the MCG (e.g., NR) overlap in time with UE transmissions in subframe $i_2$ of the SCG (e.g., LTE), NR may reserve a power level equal to MGP_LTE[i1, i2]=$\gamma$_LTE×Pcmax(i1, i2) or MGP_LTE[i1, i2]=$\gamma$_LTE×P_{EN-DC, Total} for LTE, so that P_MCG(i1)≤P_{EN-DC, Total}−min{MGP_LTE[i1, i2], P_SCG(i2)} in any portion of slot i1 of the MCG (e.g., NR), otherwise the UE reduces transmission power in any portion of slot i1 of the MCG (e.g., NR) so that P_MCG(i1)≤P_{EN-DC, Total}−min{MGP_LTE[i1, i2], P_SCG(i2)} in any portion of slot i1 of the MCG. On the other hand, if P_LTE+P_NR>P_{EN-DC, total}, if $\hat{P}_{MCG}(i_1)+\hat{P}_{SCG}(i_2)>\hat{P}_{Total}^{EN-DC}$ in any portion of subframe $i_2$ of the SCG, then, if the UE indicates a certain capability for dynamic NE-DC power sharing in which NR processing time is configured to be as slow as LTE (e.g., legacy LTE, short-processing LTE, or sTTI LTE, whichever the UE is configured with), then the UE reduces transmission power in any portion of subframe $i_2$ of the SCG (i.e., LTE) so that $\hat{P}_{MCG}(i_1)+\hat{P}_{SCG}(i_2)\le\hat{P}_{Total}^{EN-DC}$ in any portion of subframe $i_2$, where $\hat{P}_{MCG}(i_1)$ and $\hat{P}_{SCG}(i_2)$ are the linear values of the total UE transmission powers in slot $i_1$ of the MCG and in subframe $i_2$ of the SCG, respectively. If an NR processing time is configured to be faster than LTE (e.g., legacy LTE, short-processing LTE, TTI LTE, whichever the UE is configured with), then the UE drops the transmission in any portion of subframe $i_2$ of the SCG or stops the transmission of subframe $i_2$ of the SCG (e.g., LTE).

As may be appreciated, NR may be at least as fast as LTE; therefore, there may be no problem in real-time computing Pcmax(i1,i2) by NR to determine and respect, observe, and/or accommodate the MGP for LTE. However, in some embodiments, the UE may be configured with an absolute number (e.g., in dBm) for the MGP of LTE (e.g., P_{LTE, min}) to avoid any computation issues in NE-DC operation.

In some embodiments, such as for an MGP for NR in NE-DC operation, there may be at least the following three options: a) there is no MGP for NR, e.g., $\gamma$_NR=0; b) the MGP for NR is based on $\gamma$_NR=1−$\gamma$_LTE; and c) the MGP for NR is based on a separately configured 0<$\gamma$_NR<1−$\gamma$_LTE. If an NR is a MCG and its processing time is as fast as LTE, no MGP for NR may be needed for NE-DC operation.

In certain embodiments, a "cut-off" time for how to determine whether a PHR value for a serving cell in an NR-CA (or NR-DC or MR-DC) operation may be based on actual or virtual PHR to avoid tight timeline issues for PHR computation for transmissions in which UL grant and/or scheduling DCI arrive late (e.g., very close to the start of the PUSCH transmission that carries the PHR). The "cut-off" time for actual and/or virtual PHR determination may be defined as the first UL grant for a new transmission after PHR trigger, so a UE may report actual PHR for all overlapping transmissions (e.g., on all cells) for which UL grants are received before "the first UL grant after PHR trigger," and reports virtual PHR for all other cells even if they have a transmission, but whose UL grant is received after "the first UL grant after PHR trigger."

In various embodiments, a UE determines whether a PH value for an activated serving cell is based on a real transmission or a reference format by considering downlink control information that has been received until and including a PDCCH occasion in which a first UL grant for a new transmission is received since a PHR has been triggered.

In some embodiments, a grant-reception time may be a "loose cut-off time" because a UE may be able to process a PUSCH transmission in a faster fashion (e.g., per a UE minimum PUSCH preparation procedure time), and, therefore, the UE may be able to accommodate more actual PHRs (which may be more useful than virtual PHR) if a more stringent timeline is considered for generation and transmission of PHR.

In one embodiment, a UE determines whether a PH value for an activated serving cell is based on real transmission or a reference format by considering downlink control information (e.g., uplink related) as well as RRC signaling or MAC CE signaling that allocates UL resources that have been received until (and including/at) a number of symbols equal to a UE PUSCH preparation procedure time (e.g., minimum UE PUSCH preparation procedure time) before a first symbol of a PUSCH transmission corresponding to an UL grant used for the transmission of a triggered PHR.

In certain embodiments, a UE determines whether a PH value for an activated serving cell is based on a real transmission or a reference format by considering downlink control information (e.g., uplink related) as well as RRC signaling or MAC CE signaling allocating UL resources that have been received until (and including/at) $K_{PUSCH}$ symbols before a first symbol for a PUSCH transmission occasion used for a transmission of a triggered PHR.

In various embodiments, a UE may not be expected to transmit and/or multiplex PHR MAC CE on a PUSCH transmission having a start time less than [X] symbols after a time instance in which PHR is triggered. In one example, [X] may be equal to K_PUSCH. In another example, [X] may be equal to a UE minimum processing and/or preparation time for PUSCH.

As may be appreciated, K_PUSCH may be based on agreements and/or specification text. If a PUSCH transmission is in response to a detection by a UE of a DCI format 0_0 or DCI format 0_1, $K_{PUSCH}$ may be a number of symbols for UL BWP b of carrier f of serving cell c after a last symbol of a corresponding PDCCH and before a first symbol of the PUSCH transmission. If a PUSCH transmission is configured by a higher layer parameter (e.g., ConfiguredGrantConfig), $K_{PUSCH}$ may be a number of $K_{PUSCH,min}$ symbols equal to a product of a number of symbols per slot, $N_{symb}^{slot}$, and a minimum of values provided by a higher layer parameter (e.g., k2) and for UL BWP b of carrier f of serving cell c.

In some embodiments, for PUSCH transmission triggered by an uplink grant, K_PUSCH may be a time duration between an uplink grant and a start of a PUSCH transmission. A K value for a non-scheduled UL transmission may be a minimum of common configured K2 values of an associated BWP. Such embodiments may apply for both PUSCH and SRS.

In various embodiments, an antenna port may be defined such that a channel over which a symbol on the antenna port is conveyed may be inferred from the channel over which another symbol on the same antenna port is conveyed. One or more antenna ports may be used for UL transmissions.

In some embodiments, two antenna ports may be considered to be QCL if large-scale properties of a channel over which a symbol on one antenna port is conveyed may be inferred from a channel over which a symbol on the other antenna port is conveyed. The large-scale properties may include one or more of: delay spread, Doppler spread, Doppler shift, average gain, average delay, and/or spatial RX parameters. Moreover, two antenna ports may be QCL with respect to a subset of the large-scale properties. Spatial RX parameters may include one or more of: AoA, dominant AoA, average AoA, angular spread, PAS of AoA, average AoD, PAS of AoD, transmit channel correlation, receive channel correlation, transmit beamforming, receive beamforming, and/or spatial channel correlation.

As used herein, an antenna port may be a logical port that may correspond to a beam (e.g., resulting from beamforming) or may correspond to a physical antenna on a device. In some embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights, a cyclic delay, or both to a signal on each physical antenna. In certain embodiments, a physical antenna set may have antennas from a single module or panel, or from multiple modules or panels. The weights may be fixed as in an antenna virtualization scheme, such as CDD. A procedure used to derive antenna ports from physical antennas may be specific to a device implementation and may be transparent to other devices.

In various embodiments, 5G NR may support two UL MIMO transmission schemes for PUSCH: codebook-based transmission, and non-codebook-based transmission. In the latter, e.g., non-codebook-based transmission, a scheduling DCI only includes SRI that indicates a selection of one or multiple SRS resources from up to 4 SRS resources that are configured in the SRS resource set with 'usage' set to 'nonCodebook' and that are among the most recent SRS transmissions. In certain embodiments, no RI and TPMI parameters are included in scheduling DCI. A transmission rank may be the same as a number of selected SRS resources because all SRS resources in a "non-codebook" set have only 1 port, and a precoder is transparent to a gNB because it is also applied to a DMRS. In some embodiments, a calculation of a precoder at a UE may be based on measuring a DL signal, and a parameter (e.g., associated CSI-RS) that is either RRC configured (e.g., for p-SRS and sp-SRS) or RRC configured and DCI indicated with an SRS request field (e.g., for ap-SRS). In various embodiments, SRS-SpatialRelationInfo may not be configured in a "non-codebook" SRS resource set. As may be appreciated, if a parameter (e.g., associated CSI-RS) is configured, a PUSCH beam and/or UL spatial relation and/or filter (e.g., UE TX beam) may inherently and/or implicitly follow (e.g., is QCL with) the UE RX beam, DL spatial relation, and/or filter that was used to receive the parameter (e.g., associated CSI-RS). It should be noted that all PUSCH ports (e.g., at least on an antenna array or sub-array) may follow a same beam and/or spatial filter used to receive the parameter (e.g., the associated CSI-RS) on the antenna array or sub-array.

In certain embodiments, only one of two higher layer RRC parameters (e.g., associated CSI-RS or SRS-SpatialRelationInfo), but not both, may be configured via transmission to the UE. In some embodiments, for non-codebook based transmission, a UE may not expect to be configured with both spatialRelationInfo for SRS resource and associatedCSI-RS in SRS-Config for an SRS resource set.

In various embodiments, for non-codebook based transmission, if associatedCSI-RS is not configured in SRS-Config for an SRS resource set with usage set to 'nonCodebook' and if a UE is configured with a higher layer parameter SRS-spatialRelationInfo containing an ID of a reference 'ssb-Index' or a 'csi-RS-Index', the UE may calculate a precoder used for the transmission of a precoded SRS associated with an SRS resource based on measurement of the referenceSignal provided by higher layer parameter SRS-spatialRelationInfo for the SRS resource. If the UE is configured with the higher layer parameter SRS-spatialRelationInfo containing the ID of a reference 'srs', the UE may calculate the precoder used for the transmission of precoded SRS associated with an SRS resource based on measurement of a reference SS/PBCH block or a reference CSI-RS whose ID is provided in the SRS-spatialRelationInfo of the reference 'srs'.

In some embodiments, a "single-hop SRS chain" (e.g., SpatialRelationInfo for a first SRS resource such as an SRS resource for non-codebook-based transmission) may be linked not to a DL signal (e.g., SSB or CSI-RS) but to a second SRS resource (e.g., an SRS resource for beam management), and then the SpatialRelationInfo for the second SRS resource may be linked to a DL signal (e.g., SSB or CSI-RS). Although a "single-hop SRS chain" may be used, a "multi-hop SRS chain" may be used in which a first SRS resource is linked to a second SRS resource, and then the second SRS resource is linked to a third SRS resource, and so forth. In such embodiments, the "SRS chain" may end after a finite number of "hops" because at least one SRS resource may need to be directly linked to a DL reference signal (e.g., SSB or CSI-RS).

In certain embodiments, for non-codebook based transmission, if associatedCSI-RS is not configured in SRS-Config for an SRS resource set with usage set to 'nonCodebook' and if the UE is configured with a higher layer parameter SRS-spatialRelationInfo containing the ID of a reference 'ssb-Index' or a 'csi-RS-Index', the UE may calculate a precoder used for transmission of a precoded SRS associated with an SRS resource based on measurement of the referenceSignal provided by higher layer parameter SRS-spatialRelationInfo for the SRS resource. If the UE is configured with the higher layer parameter SRS-spatialRelationInfo containing the ID of a reference 'srs', the UE may repeat a procedure until it reaches a SRS-SpatialRelationInfo that contains a DL reference signal (e.g., an SS/PBCH block or a CSI-RS), and then the UE may calculate the precoder used for the transmission of precoded SRS associated with an SRS resource based on measurement of the identified SS/PBCH block or CSI-RS.

Because spatialRelationInfo for each SRS resource may be individually and/or separately configured (unlike associated CSI-RS that is commonly configured for all SRS resources for a non-codebook based PUSCH), each layer of a PUSCH transmission may adopt a different precoder and a different spatial relation, UL beam, and/or UE TX beam.

In various embodiments, for a UE configured with one or more SRS resource configurations, and if the higher layer parameter resource Type in SRS-Resource is set to 'periodic': 1) if the UE is configured with the higher layer parameter spatialRelationInfo containing the ID of a reference 'ssb-Index', the UE may transmit a target SRS resource with a same spatial domain transmission filter used for the reception of the reference SS/PBCH block; 2) if the higher layer parameter spatialRelationInfo contains the ID of a reference 'csi-RS-Index' or if SRS-Resource is configured in an SRS resource set with 'usage' set to 'nonCodebook' and if the higher layer parameter associatedCSI-RS is configured, the UE may transmit a target SRS resource with the same spatial domain transmission filter used for the reception of the reference periodic CSI-RS or of the reference semi-persistent CSI-RS; and 3) if the higher layer parameter spatialRelationInfo containing the ID of a reference 'srs', the UE may transmit the target SRS resource with the same spatial domain transmission filter used for the transmission of the reference periodic SRS.

In some embodiments, for a UE configured with one or more SRS resource configurations, and if the higher layer parameter resourceType in SRS-Resource is set to 'semi-persistent': 1) if a UE receives an activation command for an SRS resource, and if the HARQ-ACK corresponding to the PDSCH carrying the selection command is transmitted in slot n, corresponding actions and the UE assumptions on SRS transmission corresponding to the configured SRS resource set may be applied starting from slot $n+3N_{slot}^{subframe,\mu}+1$. An activation command may contain spatial relation assumptions provided by a list of references to reference signal IDs, one per element of the activated SRS resource set. Each ID in the list may refer to a reference SS/PBCH block, NZP CSI-RS resource, or SRS resource configured on the same or different component carrier and/or bandwidth part as the SRS resources in the SRS resource set; 2) if an SRS resource in an activated resource set is configured with a higher layer parameter spatialRelationInfo, the UE may assume that the ID of the reference signal in the activation command overrides the one configured in spatialRelationInfo; 3) if a UE receives a deactivation command for an activated SRS resource set, and if the HARQ-ACK corresponding to the PDSCH carrying the selection command is transmitted in slot n, corresponding actions and UE assumption on cessation of SRS transmission corresponding to the deactivated SRS resource set may apply starting from slot $n+3N_{slot}^{subframe,\mu}+1$; 4) if the UE is configured with the higher layer parameter spatialRelationInfo containing the ID of a reference 'ssb-Index', the UE may transmit the target SRS resource with the same spatial domain transmission filter used for the reception of the reference SS/PBCH block. If the higher layer parameter spatialRelationInfo contains the ID of a reference 'csi-RS-Index' or if SRS-Resource is configured in an SRS resource set with 'usage' set to 'nonCodebook' and if the higher layer parameter associatedCSI-RS is configured, the UE may transmit the target SRS resource with the same spatial domain transmission filter used for the reception of the reference periodic CSI-RS or of the reference semi-persistent CSI-RS. If the higher layer parameter spatialRelationInfo contains the ID of a reference 'srs', the UE may transmit the target SRS resource with the same spatial domain transmission filter used for the transmission of the reference periodic SRS or of the reference semi-persistent SRS.

In some embodiments, if a UE has an active semi-persistent SRS resource configuration and has not received a deactivation command, the semi-persistent SRS configuration may be considered to be active in an UL BWP that is active if the SRS resource configuration is activated, otherwise it is considered suspended.

In various embodiments, for a UE configured with one or more SRS resource configurations, and if the higher layer parameter resource Type in SRS-Resource is set to 'aperiodic': 1) the UE receives a configuration of SRS resource sets; 2) the UE receives a downlink DCI, a group common DCI, or an uplink DCI based command in which a codepoint of the DCI may trigger one or more SRS resource sets. The minimal time interval between the last symbol of the PDCCH triggering the aperiodic SRS transmission and the first symbol of SRS resource is $N_2+42$; 3) if the UE is configured with the higher layer parameter spatialRelationInfo containing the ID of a reference 'ssb-Index', the UE may transmit the target SRS resource with the same spatial domain transmission filter used for the reception of the reference SS/PBCH block. If the higher layer parameter spatialRelationInfo contains the ID of a reference 'csi-RS-Index' or if SRS-Resource is configured in an SRS resource set with 'usage' set to 'nonCodebook' and if the higher layer parameter associatedCSI-RS is configured, the UE may transmit the target SRS resource with the same spatial domain transmission filter used for the reception of the reference periodic CSI-RS or of the reference semi-persistent CSI-RS, or of the latest reference aperiodic CSI-RS. If the higher layer parameter spatialRelationInfo contains the ID of a reference 'srs', the UE may transmit the target SRS resource with the same spatial domain transmission filter used for the transmission of the reference periodic SRS or of the reference semi-persistent SRS or of the reference aperiodic SRS.

In certain embodiments, if associated CSI-RS is configured for the 'nonCodebook' SRS resource set, then it may be configured commonly for all SRS resources within that set so that all SRS resources in the set may be transmitted with the same spatial transmission filter and/or direction or UE UL and/or TX beam. This may be different from embodiments in which spatialRelationInfo that is configured individually and/or separately for each SRS resource within an SRS resource set.

In some embodiments, 5G NR may support configurations in which SRS-SpatialRelationInfo follows a reference signal (e.g., SSB, CSI-RS, or SRS) from another serving cell and/or another BWP. Moreover, 5G NR may support configurations in which associated CSI-RS is from another serving cell. In such embodiments, a UE behavior for non-codebook-based PUSCH and/or SRS transmission may be generalized for cross-carrier beam indication and precoder determination.

In various embodiments, analogy or hybrid beamforming based on MIMO (e.g., massive) technology may be a key feature to achieve reliability and throughput desired for 5G NR in which both a UE and a gNB are capable of generating multiple beam patterns (e.g., at least one beam pattern at a time). In certain embodiments, a beam pattern may be formally understood and specified as a "spatial transmission filter." To determine an appropriate beam pattern for transmission of a signal and/or channel, different RS resources such as SS/PBCH blocks, CSI-RS, and/or SRS may be configured and transmitted by a UE and/or a gNB (e.g., via beam sweeping), received and measured at the gNB and/or the UE, and/or reported back to the UE and/or the gNB. In some embodiments, after good enough beams, spatial filters, directions, and/or relations are determined, later transmissions of signals and/or channels may refer to determined spatial filters, directions, relations, and/or a procedure known as "beam indication."

In certain embodiments, beam measurement, reporting, and/or indication may be based on beams and/or RS resources within the same cell, uplink carrier, and/or BWP. In some embodiments, such as collocated and/or intra-band CA (both contiguous and non-contiguous), for operation in a given "target" cell, carrier, and/or BWP, beams and/or RS resources from other "reference" cells, uplink carriers, and/or BWPs may be configured and/or indicated. In such embodiments, each serving cell may not be required to transmit all DL beams (e.g., SSB or CSI-RS) for beam indication to save signaling overhead for both gNB and the UE. Accordingly, the serving cells may split the load among themselves, and the UE may measure only a unique (e.g., non-repeated) set of DL beams. In such embodiments, the gNB may still be able to receive on all such beams and/or spatial directions. Therefore, the UE may still transmit to the target cell (not the reference cell, or not a combination) based on a beam and/or RS indication from a reference cell. Certain embodiments may support uplink cross-carrier beam indication for PUCCH and SRS. In some embodiments, there may be a cell index and BWP information in a SpatialRelation configuration.

Table 3 illustrates various RRC parameters. In certain embodiments, RRC parameters PUCCH-SpatialRelation-Info and spatialRelationInfo may be used in addition to the parameters indicated in Table 3.

TABLE 3

| RRC parameter | Value range | Description |
| --- | --- | --- |
| cell | (0 . . . maxNrofServingCells − 1) | ServCellIndex |
| bwp-Id | (0 . . . maxNrofBWPs) | BWP-Id |

In various embodiments, servingCellId may be applicable to all RS resource types (e.g., SSB, CSI-RS, SRS), but uplinkBWP may only be applicable to SRS. This may be because SS/PBCH block may not be BWP-specific, and CSI-RS, although BWP-specific, may have a unique ID across all configured BWPs and is transmitted, received, and/or measured only on an active and "valid" DL BWP (e.g., the active DL BWP, provided that CSI-RS resource is configured on that DL BWP). However, SRS may be BWP-specific and its ID may not be unique across all UL BWPs (e.g., the SRS-ID–SRS-ID=0—may be used on all or up to 4 configured UL BWPs for a UE), and in addition no measurement may be used for beam determination and/or indication, so the UE may keep in its memory how spatially an SRS resource is transmitted (e.g., based on QCL with SSB, CSI-RS, and/or SRS). Accordingly, it may be necessary to indicate an UL BWP for an SRS resource. As may be appreciated p-SRS and ap-SRS may be RRC configured, and sp-SRS may be activated by MAC-CE.

In certain embodiments, such as for p-SRS and ap-SRS, a configuration of a spatial relation between a reference RS and a target SRS of the higher layer parameter spatialRelationInfo, if configured, contains the ID of the reference RS. In such embodiments, the reference RS may be an SS/PBCH block, CSI-RS, or an SRS configured on the same or different component carrier and/or bandwidth part as the target SRS.

In some embodiments, such as for sp-SRS with MAC-CE update, an activation command may contain spatial relation assumptions provided by a list of references to reference signal IDs, one per element of the activated SRS resource set. Each ID in the list may refer to a reference SS/PBCH block, NZP CSI-RS resource, or SRS resource configured on the same or different component carrier and/or bandwidth part as the SRS resources in the SRS resource set.

In various embodiments, a spatial setting for a PUCCH transmission may be provided by a higher layer parameter PUCCH-SpatialRelationInfo if a UE is configured with a single value for a higher layer parameter pucch-SpatialrelationInfoId; otherwise, the spatial setting may be provided by the higher layer parameter PUCCH-SpatialRelationInfo from a set of multiple values provided by respective higher layer parameters pucch-SpatialRelationInfoId. In such embodiments, the UE may apply corresponding actions and a corresponding setting for a spatial domain filter to transmit PUCCH 3 ms after a slot in which the UE transmits HARQ-ACK information corresponding to a PDSCH reception providing the PUCCH-SpatialRelationInfo.

In some embodiments, if PUCCH-Spatialrelationinfo provides a higher layer parameter ssb-Index, a UE may transmit the PUCCH using a same spatial domain filter for a reception of an SS/PBCH block with an index provided by ssb-Index from the same serving cell or from a serving cell with index servingCellId, if provided; else if PUCCH-Spatialrelationinfo provides higher layer parameter csi-RS-Index, the UE may transmit the PUCCH using a same spatial domain filter as for a reception of a CSI-RS with a resource index provided by csi-RS-Index from the same serving cell or from a serving cell with index servingCellId, if provided; else PUCCH-Spatialrelationinfo provides a higher layer parameter srs, and the UE transmits the PUCCH with a same spatial domain filter used for a transmission of an SRS with a resource index provided by resourceId in srs from the uplink bandwidth part with an index provided by uplinkBWP and from the same serving cell or from a serving cell with an index servingCellId, if provided.

In certain embodiments, a configuration may be as follow: SRS-ResourceSet::=SEQUENCE {srs-ResourceSetId SRS-ResourceSetId, srs-ResourceIdList SEQUENCE (SIZE (1 . . . maxNrofSRS-ResourcesPerSet)) OF SRS-ResourceId OPTIONAL, -- Cond Setup resourceType CHOICE {aperiodic SEQUENCE {aperiodicSRS-ResourceTrigger INTEGER (1 . . . maxNrofSRS-TriggerStates-1), csi-RS NZP-CSI-RS-ResourceId OPTIONAL, -- Cond NonCodebook servingCellId ServCellIndex OPTIONAL, -- Need S slotOffset INTEGER (1 . . . 32) OPTIONAL, -- Need S . . . }, semi-persistent SEQUENCE {associatedCSI-RS NZP-CSI-RS-ResourceId servingCellId ServCellIndex OPTIONAL, -- Need S OPTIONAL, -- Cond NonCodebook}, periodic SEQUENCE {associatedCSI-RS NZP-CSI-RS-ResourceId servingCellId ServCellIndex OPTIONAL, -- Need S OPTIONAL, -- Cond NonCodebook . . . } }, usage ENUMERATED {beamManagement, codebook, nonCodebook, antennaSwitching},alpha Alpha OPTIONAL, -- Need S p0 INTEGER (−202 . . . 24) OPTIONAL, -- Cond Setup pathlossReferenceRS CHOICE {ssb-Index SSB-Index, csi-RS-Index NZP-CSI-RS-ResourceId} OPTIONAL, -- Need M srs-PowerControlAdjustmentStates ENUMERATED {sameAsFci2, separateClosedLoop} OPTIONAL, -- Need S . . . }.

In various embodiments, cross-carrier indication for power control parameters for PUCCH, if higher layer parameters "cell" and "bwp-Id" are included in the PUCCH-SpatialRelationInfo configuration, may include: a reference signal corresponding to a pathloss index 'q_d' included in PUCCH-SpatialRelationInfo from a serving cell and active BWP indicated by the higher layer parameters "cell" and "bwp-Id". If higher layer parameter pucch-SpatialRelation-Info includes higher layer parameters cell and bwp-Id, the UE may receive the RS with index $q_d$ on the DL BWP provided by bwp-Id of the serving cell provided by cell.

In some embodiments: 1) a BWP index may be applicable only if a reference signal for beam indication is an SRS resource; and/or 2) if the reference signal for beam indication is an SRS resource, the UE may be faced with a multi-step cross-carrier indication of pathloss. In such embodiments, with respect to the cross-carrier beam indication, the reference beam and/or RS resource may be an SRS (e.g., from the same or different serving cell and/or BWP) because how to transmit that SRS resource may be known to the UE and may be directly and/or immediately used. In certain embodiments, for pathloss reference, a UE may not need a DL RS resource (e.g., either an SS/PBCH block or a CSI-RS resource). Therefore, in such embodiments, the UE may repeat a cross-carrier mapping procedure until it finds a DL RS resource within some (or possibly different) serving cells and/or BWPs.

In various embodiments, such as for PUCCH, if higher layer parameters "servingCellId" and/or "uplinkBWP" are included in the PUCCH-SpatialRelationInfo configuration: If the referenceSignal in PUCCH-SpatialRelationInfo is an SSB or a CSI-RS, The reference signal corresponding to pathloss index 'q_d' included in PUCCH-SpatialRelationInfo is from the serving cell indicated by the higher layer parameter "servingCellId" in PUCCH-SpatialRelationInfo. If the referenceSignal in PUCCH-SpatialRelationInfo is SRS, the UE shall repeat the procedure until it reaches a SRS-SpatialRelationInfo that contains a DL reference signal (i.e., an SSB or a CSI-S+RS), and then the reference signal corresponding to pathloss index 'q_d' included in PUCCH-SpatialRelationInfo is from the serving cell indicated by the higher layer parameter "servingCellId" in the identified SRS-SpatialRelationInfo.

In certain embodiments, if higher layer parameter pucch-SpatialRelationInfo includes higher layer parameters servingCellId and uplinkBWP, and if the referenceSignal in PUCCH-SpatialRelationInfo is an SSB or a CSI-RS, the UE receives the RS with index $q_d$ on the serving cell provided by cell.

In some embodiments, if higher layer parameter pucch-SpatialRelationInfo includes higher layer parameters servingCellId and uplinkBWP, and if the referenceSignal in PUCCH-SpatialRelationInfo is an SRS, the UE examines the SRS-SpatialRelationInfo of the reference SRS resource from the serving cell indicated by the servingCellId and the UL BWP indicated by uplinkBWP in PUCCH-SpatialRelationInfo, and operates as follows: if the referenceSignal in the SRS-SpatialRelationInfo for the reference SRS resource is an SSB or a CSI-RS, the UE receives the RS with index $q_d$ on the serving cell provided by servingCellId in SRS-SpatialRelationInfo; if the referenceSignal in the SRS-SpatialRelationInfo for the reference SRS resource is an SRS, the UE repeats this procedure with "PUCCH-SpatialRelationInfo" replaced by "SRS-SpatialRelationInfo"; and if servingCellId is not provided in an SRS-SpatialRelationInfo, then the indicated serving cell is the same serving cell in which the SRS is configured.

In various embodiments, such as for pathloss reference of a PUSCH with DCI format 0_0, there may exist at least two cases: (i) if PUCCH-Spatialrelationinfo is RRC configured (and activated by MAC-CE), so PUSCH pathloss follows PUCCH pathloss; and (ii) if PUSCH pathloss follows a default setting of k=0.

In certain embodiments, if a PUSCH transmission is in response to a DCI format 0_0 detection, and if a UE is provided a spatial setting by higher layer parameter PUCCH-Spatialrelationinfo for a PUCCH resource with a lowest index for UL BWP b of each carrier f and serving cell c, the UE may use a same RS resource index as for a PUCCH transmission.

In some embodiments, if a PUSCH transmission is scheduled by a DCI format 0_0 and if the UE is not provided a spatial setting for a PUCCH transmission, or by a DCI format 0_1 that does not include an SRI field, or if a higher layer parameter SRI-PathlossReferenceIndex-Mapping is not provided to the UE, the UE may determine an RS resource with a respective higher layer parameter pusch-pathlossreference-index value being equal to zero.

In various embodiments, such as for PUSCH with a grant for DCI 0_0 and DCI 0_1 with no SRI field in an uplink grant, at least the following may be supported: DL RS for PL estimation may be given by, a RS corresponding to pusch-pathlossreference-index=0 of pusch-pathloss-Reference-rs (e.g., q_d=0), if only one DL RS for path loss is configured; P0 and alpha may be given by the values corresponding to p0alphasetindex=0 of p0-pusch-alpha-setconfig (e.g., j=2); if only one entry of p0-pusch-alpha-setconfig is configured for PUSCH transmission with the uplink grant, the closed loop index may be l=0.

In certain embodiments, such as for PUSCH scheduled by DCI format 0_0, if the PUSCH transmission uses a spatial relation for a PUCCH resource, the UE may use a PL reference associated with a PUCCH resource in which a spatial relation is used for the PUSCH transmission; P0 and alpha may be given by the values corresponding to p0alphasetindex=0 of p0-pusch-alpha-setconfig (e.g., j=2); and the PUSCH closed loop index l=0. In some embodiments, a cross-carrier indication of a pathloss reference may be applied.

In various embodiments, such as for codebook-based PUSCH transmission, a PUSCH beam may be based on an SRS-SpatialRelationInfo for an indicated SRS resource by SRI in DCI. If SRS-SpatialRelationInfo indicates another serving cell and BWP, SRS transmission and PUSCH transmission (including how to apply SRI, TMPI, and TRI) may still be performed in an original serving cell; however, spatial filter, beam, and pathloss reference may be with respect to another serving cell. In some embodiments, a gNB may apply an appropriate gNB RX beam and/or spatial filter to receive the SRS and PUSCH in the original serving cell, and there may be no change, loss, and/or inaccuracy to a sounding procedure (e.g., as used for CQI, MCS, etc.).

In some embodiments, such as for codebook-based PUSCH (e.g., if a higher layer parameter txConfig in PUSCH-Config is set to 'codebook'), if SRS-SpatialRelationInfo of an SRS resource indicated by SRI in DCI is configured and/or provided with a servingCellId and/or a uplinkBWP, then: if the referenceSignal in the SRS-SpatialRelationInfo for the indicated SRS resource is an SSB or a CSI-RS, the UE receives the RS with index $q_d$ on the serving cell provided by servingCellId in SRS-SpatialRelationInfo. If the referenceSignal in the SRS-SpatialRelationInfo for the indicated SRS resource is an SRS resource, then the UE examines the SRS-SpatialRelationInfo of the reference SRS resource from the serving cell provided by the servingCellId and the UL BWP provided by uplinkBWP in SRS-SpatialRelationInfo, and operates as follows: if the referenceSignal in the SRS-SpatialRelationInfo for the reference SRS resource is an SSB or a CSI-RS, the UE receives the RS with index $q_d$ on the serving cell provided by servingCellId in SRS-SpatialRelationInfo of the reference SRS resource. If the referenceSignal in the SRS-SpatialRelationInfo for the reference SRS resource is an SRS, the UE repeats the procedure with "indicated SRS resource" replaced by "reference SRS resource." If servingCellId is not provided in an SRS-SpatialRelationInfo, then the indicated serving cell is the same serving cell in which the SRS is configured.

As may be appreciated, embodiments herein that indicate they apply for codebook-based PUSCH (when the higher layer parameter txConfig in PUSCH-Config is set to 'codebook') may apply for an SRS-ResourceSet with usage set to 'codebook'.

In certain embodiments, if SRI in DCI indicates multiple SRS resources, and if the servingCellId in SRS-SpatialRelationInfo for those indicated SRS resources are different values, then a UE may receive an RS with an index $q_d$ on a serving cell provided by the smallest indicated servingCellId. Moreover, if servingCellId is not provided in an SRS-SpatialRelationInfo, then an indicated serving cell is the same serving cell in which the SRS is configured.

In some embodiments, such as for non-codebook-based PUSCH (when the higher layer parameter txConfig in PUSCH-Config is set to 'nonCodebook'), if associatedCSI-RS is not configured in SRS-Config for SRS resource set with 'usage' set to 'nonCodebook', if SRS-SpatialRelationInfo of the SRS resource(s) indicated by SRI in DCI is configured/provided with a servingCellId and/or a uplinkBWP, then: if the referenceSignal in the SRS-SpatialRelationInfo for the indicated SRS resource is an SSB or a CSI-RS, the UE receives the RS with index $q_d$ on the smallest serving cell provided by servingCellId in SRS-SpatialRelationInfo. If the referenceSignal in the SRS-SpatialRelationInfo for the indicated SRS resource is an SRS resource, then the UE examines the SRS-SpatialRelationInfo of the reference SRS resource from the serving cell provided by the servingCellId and the UL BWP provided by uplinkBWP in SRS-SpatialRelationInfo, and operates as follows: if the referenceSignal in the SRS-SpatialRelationInfo for the reference SRS resource is an SSB or a CSI-RS, the UE receives the RS with index $q_d$ on the serving cell provided by smallest servingCellId in SRS-SpatialRelationInfo of the reference SRS resource(s). If the referenceSignal in the SRS-SpatialRelationInfo for the reference SRS resource is an SRS, the UE repeats the procedure with "indicated SRS resource" replaced by "reference SRS resource". If servingCellId is not provided in an SRS-SpatialRelationInfo, then the indicated serving cell is the same serving cell in which the SRS is configured.

As may be appreciated, embodiments herein that indicate they apply for codebook-based PUSCH (when the higher layer parameter txConfig in PUSCH-Config is set to 'nonCodebook') may apply for an SRS-ResourceSet with usage set to 'nonCodeBook'.

In various embodiments, a PUSCH beam may be implicitly based on a UE RX beam used to receive an associated CSI-RS. In such embodiments, to follow beam-specific power control methodology and to follow a framework for cross-carrier beam indication, PUSCH power control parameters including a DL pathloss reference index 'q_d' and an open-loop parameter index 'j' may originate from (e.g., be associated with) a serving cell indicated for the associated CSI-RS.

In certain embodiments, such as for non-codebook-based PUSCH (when the higher layer parameter txConfig in PUSCH-Config is set to 'nonCodebook'), if associatedCSI-RS is configured in SRS-Config for SRS resource set with usage set to 'nonCodebook', and if it includes configured and/or provided with a servingCellId, then the UE receives the RS with index $q_d$ on the serving cell provided by servingCellId in associatedCSI-RS.

As may be appreciated, embodiments herein that indicate they apply for codebook-based PUSCH (when the higher layer parameter txConfig in PUSCH-Config is set to 'nonCodebook') may apply for an SRS-ResourceSet with usage set to 'nonCodebook'. Some embodiments may use pathlossReferenceLinking as a fallback mode if SRS-SpatialRelationInfo and PUCCH-SpatialRelationInfo do not contain any servingCellId.

In various embodiments, such as for group common TPC: if group TPC commands for PUSCH are received the K symbols before PUSCH transmission period i, the accumulation is updated according to all the group common TPC commands; if group TPC commands for PUCCH are received the K symbols before PUCCH transmission period i, the accumulation is updated according to all the group common TPC commands; and if group TPC commands for SRS not tied with PUSCH are received the K symbols before SRS transmission period i, the accumulation is updated according to all the group common TPC commands. In some embodiments, a UE may not accumulate any group-common TPC for PUSCH for TPC closed-loop index '1' which does not correspond (e.g., not same as) to the higher-layer (e.g., RRC) configured closed-loop index for a configured grant.

In some embodiments, such as when the UE is power-limited, prioritization for transmission power reduction may be needed for transmissions that overlap. In various embodiments, such as for single cell operation with two uplink carriers or for operation with carrier aggregation, if a total UE transmit power for a PUSCH or PUCCH or PRACH or SRS transmission in a respective transmission occasion i would exceed Pcmax(i) in transmission occasion i, the UE allocates power to PUSCH/PUCCH/PRACH/SRS transmissions according to the following priority order (in descending order) so that the total UE transmit power is smaller than or equal to Pcmax(i) in every symbol of transmission occasion i:PRACH transmission on the PCell>PUCCH transmission with HARQ-ACK information and/or SR or PUSCH transmission with HARQ-ACK information>PUCCH transmission with CSI or PUSCH transmission with CSI>PUSCH transmission without HARQ-ACK information or CSI>SRS transmission, with aperiodic SRS having higher priority than semi-persistent and/or periodic SRS, or PRACH transmission on a serving cell other than the PCell. When determining a total transmit power in a symbol of transmission occasion i, the UE does not include power for transmissions starting after the symbol of transmission occasion i. The total UE transmit power is defined as the sum of the linear values of UE transmit powers for PUSCH, PUCCH, PRACH, and SRS.

In certain embodiments, if a priority order is the same and for operation with carrier aggregation, a UE prioritizes power allocation for transmissions on the primary cell of the MCG or the SCG over transmissions on a secondary cell and prioritizes power allocation for transmissions on the PCell over transmissions on the PSCell. In some embodiments, if a priority order is the same and for operation with two uplink carriers, a UE prioritizes power allocation for transmissions on the carrier in which the UE is configured to transmit PUCCH. If PUCCH is not configured on either of the two uplink carriers, the UE prioritizes power allocation for transmissions on the non-supplementary UL carrier.

In various embodiments, if a UE determines that a Type 3 power headroom report for an activated serving cell is based on a reference SRS transmission or format then, for SRS transmission occasion i on UL BWP b of carrier f of serving cell c, and if the UE is not configured for PUSCH transmissions on UL BWP b of carrier f of serving cell c, the UE computes a Type 3 power headroom report as $PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{f,c}(i)\}$ [dB] where $q_s$ is a SRS resource set corresponding to SRS-ResourceSetId=0 and $P_{O\_SRS,b,f,c}(q_s)$, $\alpha_{SRS,f,c}(q_s)$, $PL_{b,f,c}(q_d)$ and $h_{b,f,c}(i)$ are defined with corresponding values obtained from SRS-ResourceSetId=0. $\hat{P}_{CMAX,f,c}(i)$ is computed assuming MPR=0 dB, A-MPR=0 dB, P-MPR=0 dB and $\Delta T_C$=0 dB. MPR, A-MPR, P-MPR and $\Delta T_C$ may be configured or defined.

In certain embodiments, if a UE is configured with two UL carriers for a serving cell and the UE determines a Type 3 power headroom report for the serving cell based on a reference SRS transmission, the UE computes a Type 3 power headroom report for the serving cell assuming a reference SRS transmission on the UL carrier provided by higher layer parameter pucch-Config. If pucch-Config is not configured on either of the two uplink carriers, the UE computes a Type 3 power headroom report for the serving cell assuming a reference SRS transmission on the non-supplementary UL carrier.

Figure 9:
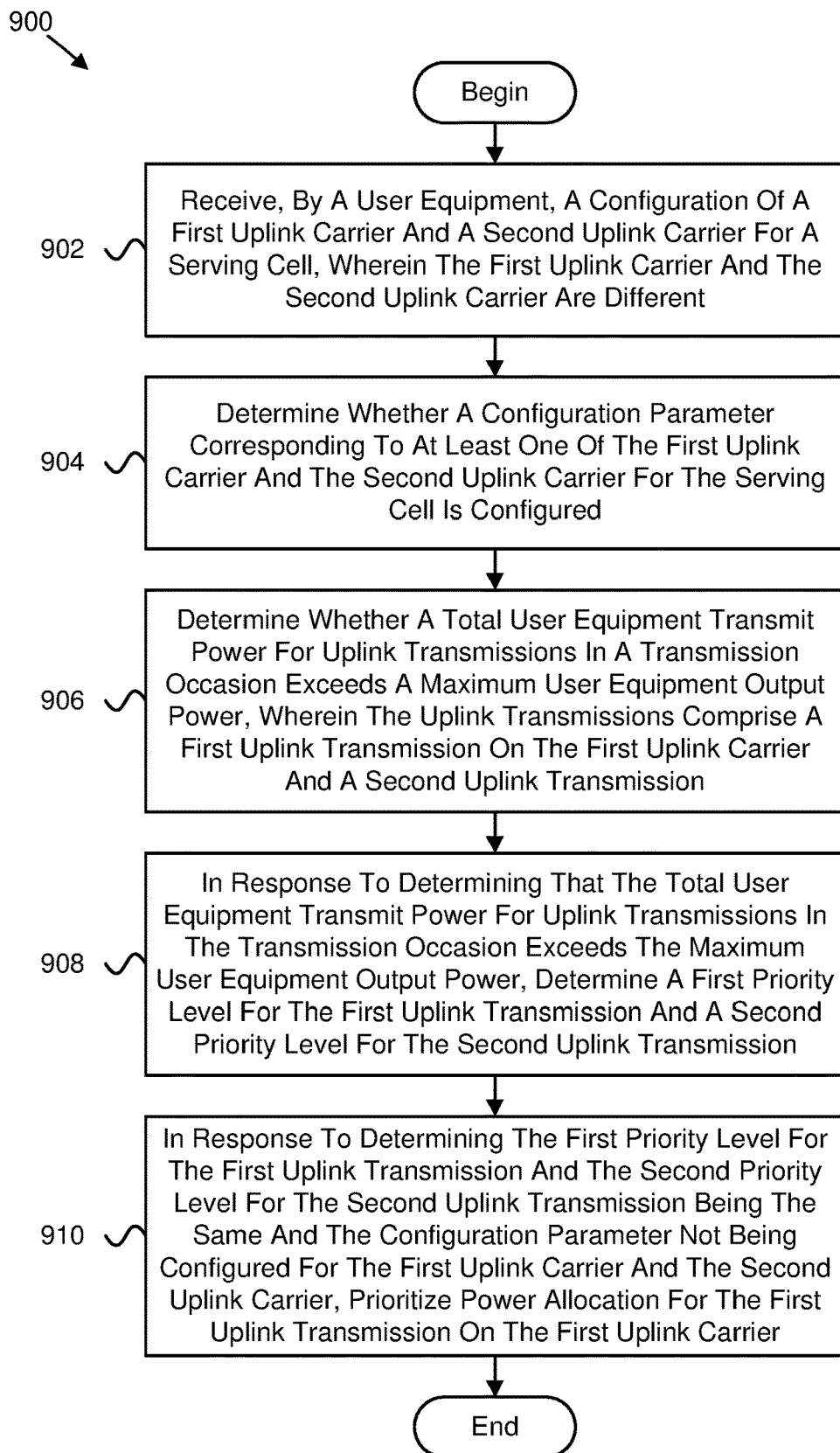
FIG. 9 is a flow chart diagram illustrating one embodiment of a method for uplink transmission power allocation.

FIG. 9 is a flow chart diagram illustrating one embodiment of a method 900 for uplink transmission power allocation. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902, by a user equipment, a configuration of a first uplink carrier and a second uplink carrier for a serving cell, wherein the first uplink carrier and the second uplink carrier are different. In certain embodiments, the method 900 includes determining 904 whether a configuration parameter corresponding to at least one of the first uplink carrier and the second uplink carrier for the serving cell is configured. In various embodiments, the method 900 includes determining 906 whether a total user equipment transmit power for uplink transmissions in a transmission occasion exceeds a maximum user equipment output power, wherein the uplink transmissions comprise a first uplink transmission on the first uplink carrier and a second uplink transmission. In some embodiments, the method 900 includes, in response to determining that the total user equipment transmit power for uplink transmissions in the transmission occasion exceeds the maximum user equipment output power, determining 908 a first priority level for the first uplink transmission and a second priority level for the second uplink transmission. In certain embodiments, the method 900 includes, in response to determining the first priority level for the first uplink transmission and the second priority level for the second uplink transmission being the same and the configuration parameter not being configured for the first uplink carrier and the second uplink carrier, prioritizing 910 power allocation for the first uplink transmission on the first uplink carrier.

In certain embodiments, the second uplink transmission is on a second uplink carrier of the serving cell, the first uplink carrier comprises a non-supplementary uplink carrier, and the second uplink carrier comprising a supplementary uplink carrier. In some embodiments, determining whether the total user equipment transmit power for uplink transmissions in the transmission occasion exceeds the maximum user equipment output power comprises determining whether the user equipment is power-limited. In various embodiments, the serving cell is a first serving cell, and the method further comprises operating the user equipment with carrier aggregation on the first serving cell and a second serving cell.

In one embodiment, the second serving cell comprises a third uplink carrier and a fourth uplink carrier, the configuration parameter is not configured for the third uplink carrier and the fourth uplink carrier, the second uplink transmission is on the fourth uplink carrier, and the fourth uplink carrier comprises a supplementary uplink carrier. In certain embodiments, the serving cell is a first serving cell, and the method further comprises operating the user equipment with dual connectivity on the first serving cell and a second serving cell. In some embodiments, determining the first priority level for the first uplink transmission and the second priority level for second uplink transmission comprises determining the first priority level for the first uplink transmission and the second priority level for second uplink transmission based on at least one predetermined priority rule.

In various embodiments, the configuration parameter comprises a control channel. In one embodiment, the control channel comprises a physical uplink control channel. In certain embodiments, the first uplink carrier comprises a non-supplementary uplink carrier and the second carrier comprises a supplementary uplink carrier. In some embodiments, the maximum user equipment output power comprises a configured maximum user equipment output power.

Figure 10:
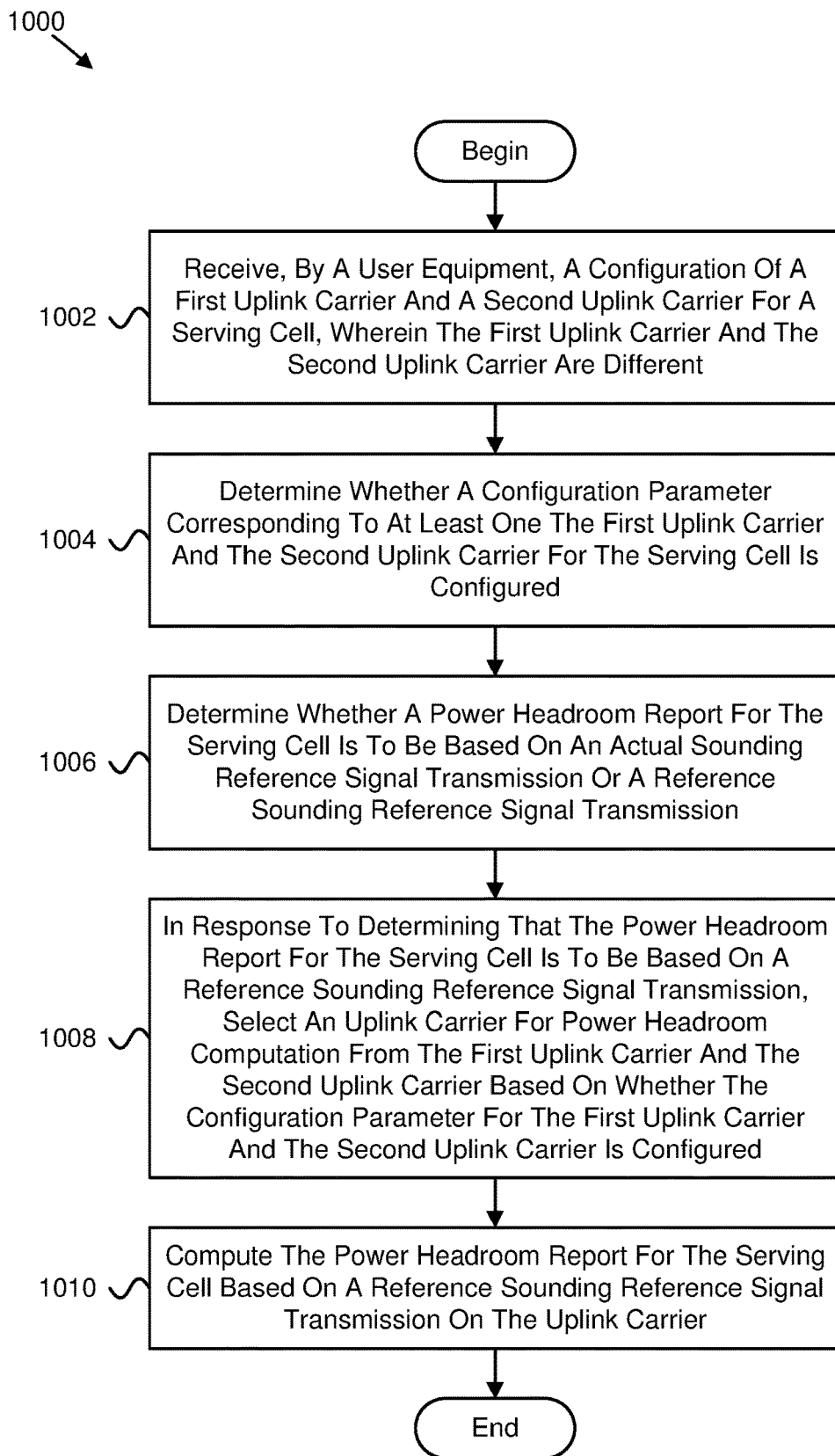
FIG. 10 is a flow chart diagram illustrating another embodiment of a method for uplink transmission power allocation.

FIG. 10 is a flow chart diagram illustrating another embodiment of a method 1000 for uplink transmission power allocation. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002, by a user equipment, a configuration of a first uplink carrier and a second uplink carrier for a serving cell, wherein the first uplink carrier and the second uplink carrier are different. In certain embodiments, the method 1000 includes determining 1004 whether a configuration parameter corresponding to at least one the first uplink carrier and the second uplink carrier for the serving cell is configured. In various embodiments, the method 1000 includes determining 1006 whether a power headroom report for the serving cell is to be based on an actual sounding reference signal transmission or a reference sounding reference signal transmission. In some embodiments, the method 1000 includes, in response to determining that the power headroom report for the serving cell is to be based on a reference sounding reference signal transmission, selecting 1008 an uplink carrier for power headroom computation from the first uplink carrier and the second uplink carrier based on whether the configuration parameter for the first uplink carrier and the second uplink carrier is configured. In certain embodiments, the method 1000 includes computing 1010 the power headroom report for the serving cell based on a reference sounding reference signal transmission on the uplink carrier.

In certain embodiments, the method 1000 further comprises, in response to the configuration parameter for the first carrier and the second carrier not being configured, selecting the uplink carrier for the power headroom computation as the first uplink carrier, and computing the power headroom report for the serving cell based on the reference sounding reference signal transmission on the first uplink carrier. In some embodiments, the first uplink carrier comprises a non-supplementary uplink carrier and the second uplink carrier comprises a supplementary uplink carrier.

In various embodiments, the method 1000 further comprises, in response to the configuration parameter for one of the first carrier and the second carrier being configured, selecting the uplink carrier for the power headroom computation as the uplink carrier for which the configuration parameter is configured, and computing the power headroom report for the serving cell based on the reference sounding reference signal transmission on the uplink carrier. In one embodiment, the configuration parameter comprises a control channel configuration. In certain embodiments, the control channel configuration comprises a physical uplink control channel configuration. In some embodiments, the power headroom report comprises a Type 3 power headroom report.

Figure 11:
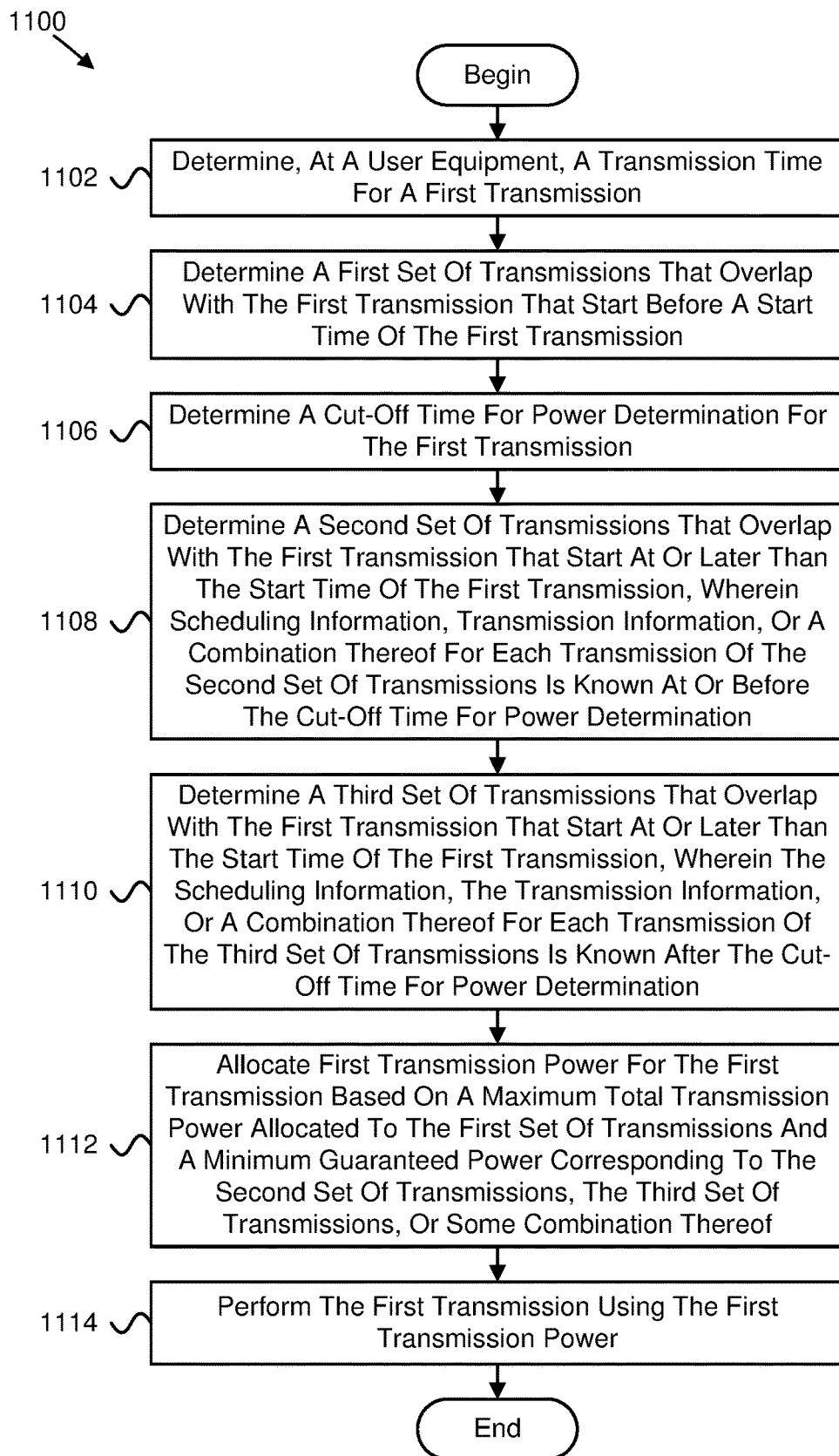
FIG. 11 is a flow chart diagram illustrating a further embodiment of a method for uplink transmission power allocation.

FIG. 11 is a flow chart diagram illustrating a further embodiment of a method 1100 for uplink transmission power allocation. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include determining 1102, at a user equipment, a transmission time for a first transmission. In certain embodiments, the method 1100 includes determining 1104 a first set of transmissions that overlap with the first transmission that start before a start time of the first transmission. In various embodiments, the method 1100 includes determining 1106 a cut-off time for power determination for the first transmission. In some embodiments, the method 1100 includes determining 1108 a second set of transmissions that overlap with the first transmission that start at or later than the start time of the first transmission, wherein scheduling information, transmission information, or a combination thereof for each transmission of the second set of transmissions is known at or before the cut-off time for power determination. In certain embodiments, the method 1100 includes determining 1110 a third set of transmissions that overlap with the first transmission that start at or later than the start time of the first transmission, wherein the scheduling information, the transmission information, or a combination thereof for each transmission of the third set of transmissions is known after the cut-off time for power determination. In various embodiments, the method 1100 includes allocating 1112 first transmission power for the first transmission based on a maximum total transmission power allocated to the first set of transmissions and a minimum guaranteed power corresponding to the second set of transmissions, the third set of transmissions, or some combination thereof. In some embodiments, the method 1100 includes performing 1114 the first transmission using the first transmission power.

In certain embodiments, allocating first transmission power for the first transmission comprises: calculating the minimum guaranteed power for the second set of transmissions and the minimum guaranteed power for the third set of transmissions; allocating first set transmission power to the first set of transmissions based on an aggregate power corresponding to the first set of transmissions; allocating third set transmission power to the third set of transmissions, wherein the third set transmission power is based on the minimum guaranteed power for the third set of transmissions; and allocating second set transmission power to the second set of transmissions based the minimum guaranteed power for the second set of transmissions.

In some embodiments, the cut-off time for power determination for the first transmission is based on an uplink transmission time offset by an offset time. In various embodiments, the offset time comprises a minimum physical uplink shared channel preparation time. In one embodiment, the cut-off time for power determination for the first transmission is based on downlink control information, a higher-layer signaling time, or a combination thereof.

In certain embodiments, the cut-off time for power determination for the first transmission is based on an uplink transmission time. In some embodiments, the minimum guaranteed power is a semi-statically configured factor of a configured maximum transmission power. In various embodiments, the minimum guaranteed power corresponds to a configured maximum transmission power for a highest priority overlapping transmission.

In one embodiment, the cut-off time for power determination for the first transmission is based on downlink control information reception time offset by an offset time. In certain embodiments, the offset time is based on a minimum physical downlink control channel processing time, a minimum physical uplink control channel preparation time, a sounding reference signal transmission preparation time, or some combination thereof.

In some embodiments, the method 1100 further comprising operating the user equipment with dual connectivity comprising a first cell group and a second cell group, wherein at least the first transmission is on a first serving cell of a first cell group, and at least one transmission of the first set of transmissions, the second set of transmissions, and the third set of transmissions is on a second serving cell of the second cell group. In various embodiments, the method 1100 further comprises operating the first serving cell with a first numerology and the second serving cell with a second numerology, wherein the first numerology and the second numerology are different.

In one embodiment, a method comprises: receiving, by a user equipment, a configuration of a first uplink carrier and a second uplink carrier for a serving cell, wherein the first uplink carrier and the second uplink carrier are different; determining whether a configuration parameter corresponding to at least one of the first uplink carrier and the second uplink carrier for the serving cell is configured; determining whether a total user equipment transmit power for uplink transmissions in a transmission occasion exceeds a maximum user equipment output power, wherein the uplink transmissions comprise a first uplink transmission on the first uplink carrier and a second uplink transmission; in response to determining that the total user equipment transmit power for uplink transmissions in the transmission occasion exceeds the maximum user equipment output power, determining a first priority level for the first uplink transmission and a second priority level for the second uplink transmission; and, in response to determining the first priority level for the first uplink transmission and the second priority level for the second uplink transmission being the same and the configuration parameter not being configured for the first uplink carrier and the second uplink carrier, prioritizing power allocation for the first uplink transmission on the first uplink carrier.

In certain embodiments, the second uplink transmission is on a second uplink carrier of the serving cell, the first uplink carrier comprises a non-supplementary uplink carrier, and the second uplink carrier comprising a supplementary uplink carrier.

In some embodiments, determining whether the total user equipment transmit power for uplink transmissions in the transmission occasion exceeds the maximum user equipment output power comprises determining whether the user equipment is power-limited.

In various embodiments, the serving cell is a first serving cell, and the method further comprises operating the user equipment with carrier aggregation on the first serving cell and a second serving cell.

In one embodiment, the second serving cell comprises a third uplink carrier and a fourth uplink carrier, the configuration parameter is not configured for the third uplink carrier and the fourth uplink carrier, the second uplink transmission is on the fourth uplink carrier, and the fourth uplink carrier comprises a supplementary uplink carrier.

In certain embodiments, the serving cell is a first serving cell, and the method further comprises operating the user equipment with dual connectivity on the first serving cell and a second serving cell.

In some embodiments, determining the first priority level for the first uplink transmission and the second priority level for second uplink transmission comprises determining the first priority level for the first uplink transmission and the second priority level for second uplink transmission based on at least one predetermined priority rule.

In various embodiments, the configuration parameter comprises a control channel.

In one embodiment, the control channel comprises a physical uplink control channel.

In certain embodiments, the first uplink carrier comprises a non-supplementary uplink carrier and the second carrier comprises a supplementary uplink carrier.

In some embodiments, the maximum user equipment output power comprises a configured maximum user equipment output power.

In one embodiment, an apparatus comprises: a receiver that receives a configuration of a first uplink carrier and a second uplink carrier for a serving cell, wherein the first uplink carrier and the second uplink carrier are different; and a processor that: determines whether a configuration parameter corresponding to at least one of the first uplink carrier and the second uplink carrier for the serving cell is configured; determines whether a total apparatus transmit power for uplink transmissions in a transmission occasion exceeds a maximum apparatus output power, wherein the uplink transmissions comprise a first uplink transmission on the first uplink carrier and a second uplink transmission; in response to determining that the total apparatus transmit power for uplink transmissions in the transmission occasion exceeds the maximum apparatus output power, determines a first priority level for the first uplink transmission and a second priority level for the second uplink transmission; and, in response to determining the first priority level for the first uplink transmission and the second priority level for the second uplink transmission being the same and the configuration parameter not being configured for the first uplink carrier and the second uplink carrier, prioritizes power allocation for the first uplink transmission on the first uplink carrier.

In certain embodiments, the second uplink transmission is on a second uplink carrier of the serving cell, the first uplink carrier comprises a non-supplementary uplink carrier, and the second uplink carrier comprising a supplementary uplink carrier.

In some embodiments, the processor determining whether the total apparatus transmit power for uplink transmissions in the transmission occasion exceeds the maximum apparatus output power comprises the processor determining whether the apparatus is power-limited.

In various embodiments, the serving cell is a first serving cell, and the processor operates the apparatus with carrier aggregation on the first serving cell and a second serving cell.

In one embodiment, the second serving cell comprises a third uplink carrier and a fourth uplink carrier, the configuration parameter is not configured for the third uplink carrier and the fourth uplink carrier, the second uplink transmission is on the fourth uplink carrier, and the fourth uplink carrier comprises a supplementary uplink carrier.

In certain embodiments, the serving cell is a first serving cell, and the processor operates the apparatus with dual connectivity on the first serving cell and a second serving cell.

In some embodiments, the processor determining the first priority level for the first uplink transmission and the second priority level for second uplink transmission comprises the processor determining the first priority level for the first uplink transmission and the second priority level for second uplink transmission based on at least one predetermined priority rule.

In various embodiments, the configuration parameter comprises a control channel.

In one embodiment, the control channel comprises a physical uplink control channel.

In certain embodiments, the first uplink carrier comprises a non-supplementary uplink carrier and the second carrier comprises a supplementary uplink carrier.

In some embodiments, the maximum apparatus output power comprises a configured maximum apparatus output power.

In one embodiment, a method comprises: receiving, by a user equipment, a configuration of a first uplink carrier and a second uplink carrier for a serving cell, wherein the first uplink carrier and the second uplink carrier are different; determining whether a configuration parameter corresponding to at least one the first uplink carrier and the second uplink carrier for the serving cell is configured; determining whether a power headroom report for the serving cell is to be based on an actual sounding reference signal transmission or a reference sounding reference signal transmission; in response to determining that the power headroom report for the serving cell is to be based on a reference sounding reference signal transmission, selecting an uplink carrier for power headroom computation from the first uplink carrier and the second uplink carrier based on whether the configuration parameter for the first uplink carrier and the second uplink carrier is configured; and computing the power headroom report for the serving cell based on a reference sounding reference signal transmission on the uplink carrier.

In certain embodiments, the method further comprises, in response to the configuration parameter for the first carrier and the second carrier not being configured, selecting the uplink carrier for the power headroom computation as the first uplink carrier, and computing the power headroom report for the serving cell based on the reference sounding reference signal transmission on the first uplink carrier.

In some embodiments, the first uplink carrier comprises a non-supplementary uplink carrier and the second uplink carrier comprises a supplementary uplink carrier.

In various embodiments, the method further comprises, in response to the configuration parameter for one of the first carrier and the second carrier being configured, selecting the uplink carrier for the power headroom computation as the uplink carrier for which the configuration parameter is configured, and computing the power headroom report for the serving cell based on the reference sounding reference signal transmission on the uplink carrier.

In one embodiment, the configuration parameter comprises a control channel configuration.

In certain embodiments, the control channel configuration comprises a physical uplink control channel configuration.

In some embodiments, the power headroom report comprises a Type 3 power headroom report.

In one embodiment, an apparatus comprises: a receiver that receives a configuration of a first uplink carrier and a second uplink carrier for a serving cell, wherein the first uplink carrier and the second uplink carrier are different; and a processor that: determines whether a configuration parameter corresponding to at least one the first uplink carrier and the second uplink carrier for the serving cell is configured; determines whether a power headroom report for the serving cell is to be based on an actual sounding reference signal transmission or a reference sounding reference signal transmission; in response to determining that the power headroom report for the serving cell is to be based on a reference sounding reference signal transmission, selects an uplink carrier for power headroom computation from the first uplink carrier and the second uplink carrier based on whether the configuration parameter for the first uplink carrier and the second uplink carrier is configured; and computes the power headroom report for the serving cell based on a reference sounding reference signal transmission on the uplink carrier.

In certain embodiments, in response to the configuration parameter for the first carrier and the second carrier not being configured, the processor selects the uplink carrier for the power headroom computation as the first uplink carrier, and computes the power headroom report for the serving cell based on the reference sounding reference signal transmission on the first uplink carrier.

In some embodiments, the first uplink carrier comprises a non-supplementary uplink carrier and the second uplink carrier comprises a supplementary uplink carrier.

In various embodiments, in response to the configuration parameter for one of the first carrier and the second carrier being configured, the processor selects the uplink carrier for the power headroom computation as the uplink carrier for which the configuration parameter is configured, and computes the power headroom report for the serving cell based on the reference sounding reference signal transmission on the uplink carrier.

In one embodiment, the configuration parameter comprises a control channel configuration.

In certain embodiments, the control channel configuration comprises a physical uplink control channel configuration.

In some embodiments, the power headroom report comprises a Type 3 power headroom report.

In one embodiment, a method comprises: determining, at a user equipment, a transmission time for a first transmission; determining a first set of transmissions that overlap with the first transmission that start before a start time of the first transmission; determining a cut-off time for power determination for the first transmission; determining a second set of transmissions that overlap with the first transmission that start at or later than the start time of the first transmission, wherein scheduling information, transmission information, or a combination thereof for each transmission of the second set of transmissions is known at or before the cut-off time for power determination; determining a third set of transmissions that overlap with the first transmission that start at or later than the start time of the first transmission, wherein the scheduling information, the transmission information, or a combination thereof for each transmission of the third set of transmissions is known after the cut-off time for power determination; allocating first transmission power for the first transmission based on a maximum total transmission power allocated to the first set of transmissions and a minimum guaranteed power corresponding to the second set of transmissions, the third set of transmissions, or some combination thereof; and performing the first transmission using the first transmission power.

In certain embodiments, allocating first transmission power for the first transmission comprises: calculating the minimum guaranteed power for the second set of transmissions and the minimum guaranteed power for the third set of transmissions; allocating first set transmission power to the first set of transmissions based on an aggregate power corresponding to the first set of transmissions; allocating third set transmission power to the third set of transmissions, wherein the third set transmission power is based on the minimum guaranteed power for the third set of transmissions; and allocating second set transmission power to the second set of transmissions based the minimum guaranteed power for the second set of transmissions.

In some embodiments, the cut-off time for power determination for the first transmission is based on an uplink transmission time offset by an offset time.

In various embodiments, the offset time comprises a minimum physical uplink shared channel preparation time.

In one embodiment, the cut-off time for power determination for the first transmission is based on downlink control information, a higher-layer signaling time, or a combination thereof.

In certain embodiments, the cut-off time for power determination for the first transmission is based on an uplink transmission time.

In some embodiments, the minimum guaranteed power is a semi-statically configured factor of a configured maximum transmission power.

In various embodiments, the minimum guaranteed power corresponds to a configured maximum transmission power for a highest priority overlapping transmission.

In one embodiment, the cut-off time for power determination for the first transmission is based on downlink control information reception time offset by an offset time.

In certain embodiments, the offset time is based on a minimum physical downlink control channel processing time, a minimum physical uplink control channel preparation time, a sounding reference signal transmission preparation time, or some combination thereof.

In some embodiments, the method further comprising operating the user equipment with dual connectivity comprising a first cell group and a second cell group, wherein at least the first transmission is on a first serving cell of a first cell group, and at least one transmission of the first set of transmissions, the second set of transmissions, and the third set of transmissions is on a second serving cell of the second cell group.

In various embodiments, the method further comprises operating the first serving cell with a first numerology and the second serving cell with a second numerology, wherein the first numerology and the second numerology are different.

In one embodiment, an apparatus comprises: a processor that: determines a transmission time for a first transmission; determines a first set of transmissions that overlap with the first transmission that start before a start time of the first transmission; determines a cut-off time for power determination for the first transmission; determines a second set of transmissions that overlap with the first transmission that start at or later than the start time of the first transmission, wherein scheduling information, transmission information, or a combination thereof for each transmission of the second set of transmissions is known at or before the cut-off time for power determination; determines a third set of transmissions that overlap with the first transmission that start at or later than the start time of the first transmission, wherein the scheduling information, the transmission information, or a combination thereof for each transmission of the third set of transmissions is known after the cut-off time for power determination; allocates first transmission power for the first transmission based on a maximum total transmission power allocated to the first set of transmissions and a minimum guaranteed power corresponding to the second set of transmissions, the third set of transmissions, or some combination thereof; and performs the first transmission using the first transmission power.

In certain embodiments, the processor allocating first transmission power for the first transmission comprises the processor: calculating the minimum guaranteed power for the second set of transmissions and the minimum guaranteed power for the third set of transmissions; allocating first set transmission power to the first set of transmissions based on an aggregate power corresponding to the first set of transmissions; allocating third set transmission power to the third set of transmissions, wherein the third set transmission power is based on the minimum guaranteed power for the third set of transmissions; and allocating second set transmission power to the second set of transmissions based the minimum guaranteed power for the second set of transmissions.

In some embodiments, the cut-off time for power determination for the first transmission is based on an uplink transmission time offset by an offset time.

In various embodiments, the offset time comprises a minimum physical uplink shared channel preparation time.

In one embodiment, the cut-off time for power determination for the first transmission is based on downlink control information, a higher-layer signaling time, or a combination thereof.

In certain embodiments, the cut-off time for power determination for the first transmission is based on an uplink transmission time.

In some embodiments, the minimum guaranteed power is a semi-statically configured factor of a configured maximum transmission power.

In various embodiments, the minimum guaranteed power corresponds to a configured maximum transmission power for a highest priority overlapping transmission.

In one embodiment, the cut-off time for power determination for the first transmission is based on downlink control information reception time offset by an offset time.

In certain embodiments, the offset time is based on a minimum physical downlink control channel processing time, a minimum physical uplink control channel preparation time, a sounding reference signal transmission preparation time, or some combination thereof.

In some embodiments, the processor operates the apparatus with dual connectivity comprising a first cell group and a second cell group, at least the first transmission is on a first serving cell of a first cell group, and at least one transmission of the first set of transmissions, the second set of transmissions, and the third set of transmissions is on a second serving cell of the second cell group.

In various embodiments, the processor operates the first serving cell with a first numerology and the second serving cell with a second numerology, and the first numerology and the second numerology are different.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving, by a user equipment, a configuration of a first uplink carrier and a second uplink carrier for a serving cell, wherein the first uplink carrier and the second uplink carrier are different, the first uplink carrier comprises a non-supplementary uplink carrier, the second uplink carrier comprises a supplementary uplink carrier, and the non-supplementary uplink carrier is associated with a first priority different than a second priority associated with the supplementary uplink carrier;
determining whether a configuration parameter corresponding to at least one of the first uplink carrier and the second uplink carrier for the serving cell is configured;
determining whether a total user equipment transmit power for uplink transmissions in a transmission occasion satisfies a user equipment output power, wherein the uplink transmissions comprise a first uplink transmission on the first uplink carrier and a second uplink transmission;
in response to determining that the total user equipment transmit power for the uplink transmissions in the transmission occasion satisfies the user equipment output power, determining a first priority level for the first uplink transmission and a second priority level for the second uplink transmission; and
in response to determining the first priority level for the first uplink transmission and the second priority level for the second uplink transmission being the same and the configuration parameter not being configured for the first uplink carrier and the second uplink carrier, prioritizing power allocation for the first uplink transmission on the first uplink carrier as a result of the first uplink carrier comprising the non-supplementary uplink carrier and the second uplink carrier comprising the supplementary uplink carrier, wherein:
the serving cell is a first serving cell;
the method further comprises operating the user equipment with carrier aggregation on the first serving cell and a second serving cell;
the second serving cell comprises a third uplink carrier and a fourth uplink carrier;
the configuration parameter is not configured for the third uplink carrier and the fourth uplink carrier;
the second uplink transmission is on the fourth uplink carrier; and
the fourth uplink carrier comprises a supplementary uplink carrier.

2. The method of claim 1, wherein the second uplink transmission is on the second uplink carrier of the serving cell.

3. The method of claim 1, wherein determining whether the total user equipment transmit power for uplink transmissions in the transmission occasion satisfies the user equipment output power comprises determining whether the user equipment is power-limited.

4. The method of claim 1, further comprising operating the user equipment with dual connectivity on the first serving cell and the second serving cell.

5. The method of claim 1, wherein determining the first priority level for the first uplink transmission and the second priority level for the second uplink transmission comprises determining the first priority level for the first uplink transmission and the second priority level for the second uplink transmission based on a priority rule.

6. The method of claim 1, wherein the configuration parameter comprises a control channel.

7. The method of claim 6, wherein the control channel comprises a physical uplink control channel.

8. The method of claim 1, wherein the user equipment output power comprises a configured maximum user equipment output power.

9. An apparatus comprising:
- a receiver that receives a configuration of a first uplink carrier and a second uplink carrier for a serving cell, wherein the first uplink carrier and the second uplink carrier are different, the first uplink carrier comprises a non-supplementary uplink carrier, the second uplink carrier comprises a supplementary uplink carrier, and the non-supplementary uplink carrier is associated with a first priority different than a second priority associated with the supplementary uplink carrier; and
- a processor that:
  - determines whether a configuration parameter corresponding to at least one of the first uplink carrier and the second uplink carrier for the serving cell is configured;
  - determines whether a total apparatus transmit power for uplink transmissions in a transmission occasion satisfies an apparatus output power, wherein the uplink transmissions comprise a first uplink transmission on the first uplink carrier and a second uplink transmission;
  - in response to determining that the total apparatus transmit power for the uplink transmissions in the transmission occasion satisfies the apparatus output power, determines a first priority level for the first uplink transmission and a second priority level for the second uplink transmission; and
  - in response to determining the first priority level for the first uplink transmission and the second priority level for the second uplink transmission being the same and the configuration parameter not being configured for the first uplink carrier and the second uplink carrier, prioritizes power allocation for the first uplink transmission on the first uplink carrier as a result of the first uplink carrier comprising the non-supplementary uplink carrier and the second uplink carrier comprising the supplementary uplink carrier, wherein:
    - the serving cell is a first serving cell;
    - the processor operates the apparatus with carrier aggregation on the first serving cell and a second serving cell;
    - the second serving cell comprises a third uplink carrier and a fourth uplink carrier;
    - the configuration parameter is not configured for the third uplink carrier and the fourth uplink carrier;
    - the second uplink transmission is on the fourth uplink carrier; and
    - the fourth uplink carrier comprises a supplementary uplink carrier.

10. The apparatus of claim 9, wherein the second uplink transmission is on the second uplink carrier of the serving cell.

11. The apparatus of claim 9, wherein the processor determining whether the total apparatus transmit power for uplink transmissions in the transmission occasion satisfies the apparatus output power comprises the processor determining whether the apparatus is power-limited.

12. The apparatus of claim 9, wherein the processor operates the apparatus with dual connectivity on the first serving cell and the second serving cell.

13. The apparatus of claim 9, wherein the configuration parameter comprises a control channel.

14. The apparatus of claim 13, wherein the control channel comprises a physical uplink control channel.

* * * * *